US012739619B2

(12) United States Patent
Abraham et al.

(10) Patent No.: US 12,739,619 B2
(45) Date of Patent: Sep. 15, 2026

(54) METHOD AND APPARATUS FOR HANDLING TEMPORARY UE CAPABILITY CHANGES IN MUSIM OPERATION IN A WIRELESS COMMUNICATION SYSTEM

(71) Applicant: Samsung Electronics Co., Ltd., Suwon-si (KR)

(72) Inventors: Aby Kanneath Abraham, Bangalore (IN); Vinay Kumar Shrivastava, Bangalore (IN); Sriganesh Rajendran, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 288 days.

(21) Appl. No.: 18/440,208

(22) Filed: Feb. 13, 2024

(65) Prior Publication Data

US 2024/0276207 A1 Aug. 15, 2024

(30) Foreign Application Priority Data

Feb. 13, 2023 (IN) ............................ 202341009542
Feb. 16, 2023 (IN) ............................ 202341010599
Jan. 31, 2024 (IN) ............................ 2023 41009542

(51) Int. Cl.
*H04W 8/24* (2009.01)
*H04W 8/18* (2009.01)
*H04W 76/38* (2018.01)

(52) U.S. Cl.
CPC ............... *H04W 8/24* (2013.01); *H04W 8/18* (2013.01); *H04W 76/38* (2018.02)

(58) Field of Classification Search
CPC ....... H04W 76/27; H04W 76/38; H04W 8/18; H04W 8/183; H04W 8/24
See application file for complete search history.

(56) References Cited

U.S. PATENT DOCUMENTS

2020/0177230 A1 6/2020 Zeng et al.
2020/0221289 A1 7/2020 Lee et al.
2024/0089709 A1 * 3/2024 Wong .................. H04W 68/005
2024/0276207 A1 * 8/2024 Abraham .............. H04W 8/183

(Continued)

OTHER PUBLICATIONS

Asustek, Discussion on Dual Tx/Rx Multi-SIM, R2-2209856, 3GPP TSG-RAN WG2 Meeting #119bis electronic, Online, Sep. 30, 2022.

(Continued)

*Primary Examiner* — Nguyen T Vo
(74) *Attorney, Agent, or Firm* — Jefferson IP Law, LLP

(57) ABSTRACT

A user equipment (UE) in a wireless communication system is provided. The UE includes a transceiver, memory storing one or more computer programs, and one or more processors communicatively coupled to the transceiver and the memory, wherein the one or more computer programs include computer-executable instructions that, when executed by the one or more processors, cause the UE to receive, from a base station, a system information block (SIB) including a first indication on whether a transmission of a second indication is allowed, identify that a UE capability is restricted for a multi-universal subscriber identity module (MUSIM), and transmit, to the base station, a radio resource control (RRC) message including the second indication indicating a UE temporary capability restriction due to the MUSIM operation.

12 Claims, 16 Drawing Sheets

(56) References Cited

U.S. PATENT DOCUMENTS

2025/0024356 A1* 1/2025 Jung .................... H04W 48/16
2026/0012773 A1* 1/2026 Xiao .................... H04W 8/183

OTHER PUBLICATIONS

Vivo, Scenarios for Rel-18 Multi-SIM, R2-2210389, 3GPP TSG-RAN WG2 Meeting #119bis-e, EMeeting, Sep. 30, 2022.
ZTE Corporation, Consideration on the capability restriction update procedure in LTE/NR tight interworking, R2-1704652, 3GPP TSG-RAN WG2 Meeting #98, Hangzhou, China, May 6, 2017.
International Search Report dated May 21, 2024, issued in International Application No. PCT/KR2024/002004.

* cited by examiner

METHOD AND APPARATUS FOR HANDLING TEMPORARY UE CAPABILITY CHANGES IN MUSIM OPERATION IN A WIRELESS COMMUNICATION SYSTEM

CROSS-REFERENCE TO RELATED APPLICATION(S)

This application is based on and claims priority under 35 U.S.C. § 119(a) of an Indian Provisional patent application number 202341009542, filed on Feb. 13, 2023, in the Indian Patent Office, and of an Indian Provisional patent application number 202341010599, filed on Feb. 16, 2023, in the Indian Patent Office, and of an Indian Complete patent application number 202341009542, filed on Jan. 31, 2024, in the Indian Patent Office, the disclosure of each of which is incorporated by reference herein in its entirety.

BACKGROUND

1. Filed

The disclosure relates to wireless communication networking. More particularly, the disclosure relates to a method and a wireless network for handling temporary User Equipment (UE) capability changes for Multi-Subscriber Identity Module (MUSIM) operation in the wireless network.

2. Description of Related Art

Fifth Generation (5G) mobile communication technologies define broad frequency bands such that high transmission rates and new services are possible, and can be implemented not only in "Sub 6 GHz" bands such as 3.5 GHZ, but also in "Above 6 GHz" bands referred to as millimeter wave (mmWave) including 28 GHz and 39 GHz. In addition, it has been considered to implement sixth generation (6G) mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multi input multi output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of Band-Width Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and a wireless network for handling a temporary UE capability change for a MUSIM operation in the wireless network.

Additional aspect of the disclosure is to handle temporary capability restrictions for dual active MUSIM devices.

Additional aspect of the disclosure is to handle a wait timer for handling the temporary capability restrictions.

Additional aspect of the disclosure is to disclose that a network informs the UE whether the network is allowed to send temporary capability restrictions during a Radio Resource Control (RRC) setup and a RRC resume.

Additional aspect of the disclosure is to handle a scenario where the UE initiates a RRC Setup procedure/RRC Resume procedure when the network doesn't support the MUSIM dual active operations.

Additional aspect of the disclosure is to perform handover when it has received MUSIM capability restrictions, especially when the target next generation node B (gNB) doesn't support the MUSIM dual active operations.

Additional aspect of the disclosure is to disclose various operations at NWK-A between different nodes in NWK-A and between NWK-A and UE-A for updating the temporary capability due to MUSIM operations, in the case of a MUSIM UE with two USIMs (i.e. two UEs in same MUSIM device), UE-A (USIM-A) is in RRC-CONNECTED state with NWK-A. UE-B (USIM-B) is in RRC_CONNECTED state with NWK-B or is moving to RRC_CONNECTED.

Additional aspects will be set forth in part in the description which follows and, in part, will be apparent from the description, or may be learned by practice of the presented embodiments.

In accordance with an aspect of the disclosure, a UE in a wireless communication system is provided. The UE includes a transceiver, memory storing one or more computer programs, and one or more processors communicatively coupled to the transceiver and the memory, wherein the one or more computer programs include computer-executable instructions that, when executed by the one or more processors, cause the UE to receive, from a base station, a system information block (SIB) including a first indication on whether a transmission of a second indication is allowed, identify that a UE capability is restricted for a multi-universal subscriber identity module (MUSIM) operation, and transmit, to the base station, a radio resource control (RRC) message including the second indication indicating a UE temporary capability restriction due to the MUSIM operation.

In accordance with another aspect of the disclosure, a base station (BS) in a wireless communication system is provided. The BS includes a transceiver, memory storing one or more computer programs, and one or more processors communicatively coupled to the transceiver and the memory, wherein the one or more computer programs include computer-executable instructions that, when executed by the one or more processors, cause the BS to transmit, to a user equipment (UE), a system information block (SIB) including a first indication on whether a reception of a second indication is allowed, and receive, from the UE, a radio resource control (RRC) message including the second indication indicating a UE temporary capability restriction due to a multi-universal subscriber identity module (MUSIM) operation.

In accordance with an aspect of the disclosure, a method performed by a UE in a wireless communication system is provided. The method includes receiving, from a base station, a system information block (SIB) including a first indication on whether a transmission of a second indication is allowed, identifying that a UE capability is restricted for a multi-universal subscriber identity module (MUSIM) operation, and transmitting, to the base station, a radio resource control (RRC) message including the second indication indicating a UE temporary capability restriction due to the MUSIM operation.

In accordance with an aspect of the disclosure, a method performed by a BS in a wireless communication system is provided. The method includes transmitting, to a user equipment (UE), a system information block (SIB) including a first indication on whether a reception of a second indication is allowed, and receiving, from the UE, a radio resource control (RRC) message including the second indication indicating a UE temporary capability restriction due to a multi-universal subscriber identity module (MUSIM) operation.

In accordance with an aspect of the disclosure, one or more non-transitory computer-readable storage media storing one or more computer programs including computer-executable instructions that, when executed by one or more processors of a user equipment (UE), cause the UE to perform operations are provided. The operations include receiving, from a base station, a system information block (SIB) including a first indication on whether a transmission of a second indication is allowed, identifying that a UE capability is restricted for a multi-universal subscriber identity module (MUSIM) operation, and transmitting, to the base station, a radio resource control (RRC) message including the second indication indicating a UE temporary capability restriction due to the MUSIM operation.

In accordance with an aspect of the disclosure, one or more non-transitory computer-readable storage media storing one or more computer programs including computer-executable instructions that, when executed by one or more processors of a base station (BS), cause the BS to perform operations are provided. The operations include transmitting, to a user equipment (UE), a system information block (SIB) including a first indication on whether a reception of a second indication is allowed, and receiving, from the UE, a radio resource control (RRC) message including the second indication indicating a UE temporary capability restriction due to a multi-universal subscriber identity module (MUSIM) operation.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of the certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
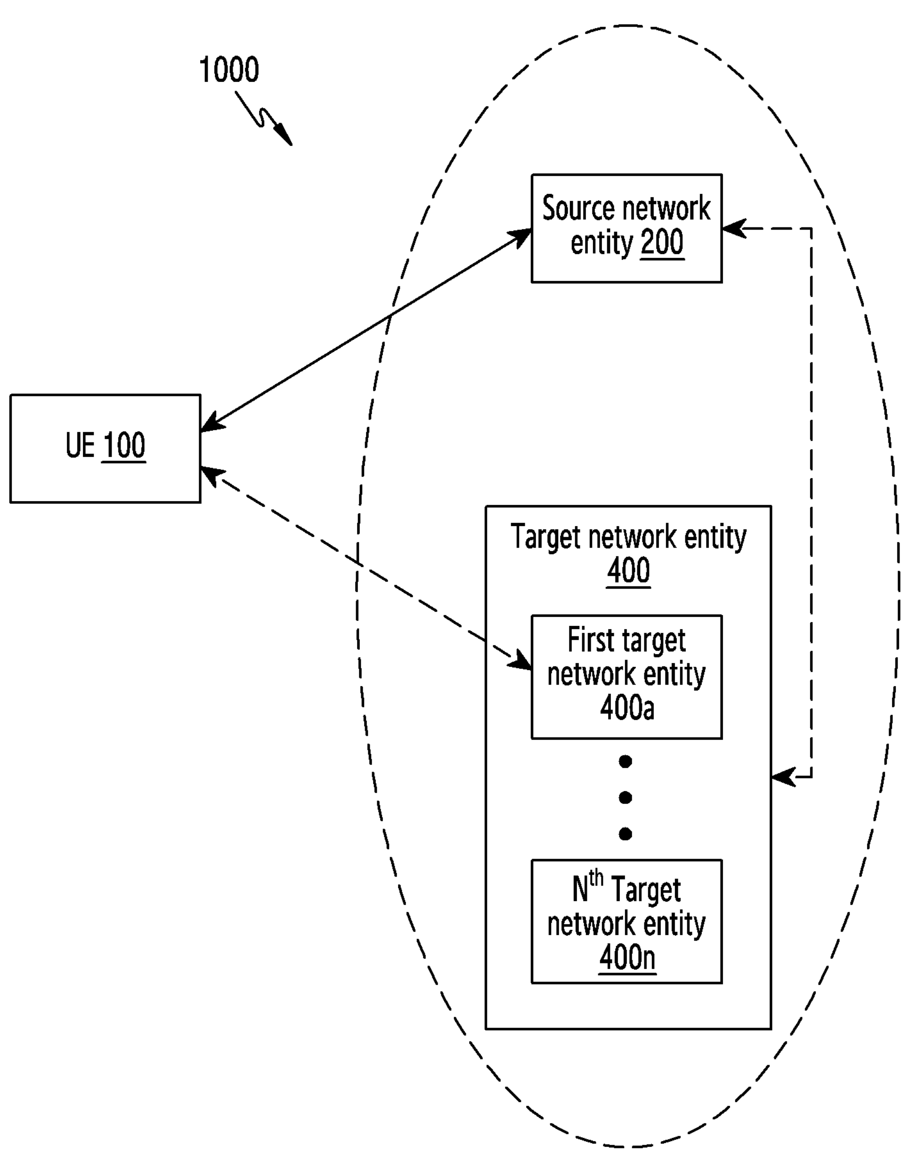
FIG. 1A is a block diagram illustrating a wireless network for handling a temporary UE capability change for a MUSIM operation, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skilled in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

For the purposes of interpreting this specification, the definitions (as defined herein) will apply and whenever appropriate the terms used in singular will also include the plural and vice versa. It is to be understood that the terminology used herein is for the purposes of describing particular embodiments only and is not intended to be limiting. The terms "comprising", "having" and "including" are to be construed as open-ended terms unless otherwise noted.

The words/phrases "exemplary", "example", "illustration", "in an instance", "and the like", "and so on", "etc.", "etcetera", "e.g.,", "i.e.," are merely used herein to mean "serving as an example, instance, or illustration." Any embodiment or implementation of the present subject matter described herein using the words/phrases "exemplary", "example", "illustration", "in an instance", "and the like", "and so on", "etc.", "etcetera", "e.g.,", "i.e.," is not necessarily to be construed as preferred or advantageous over other embodiments.

Embodiments herein may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by a firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

It should be noted that elements in the drawings are illustrated for the purposes of this description and ease of understanding and may not have necessarily been drawn to scale. For example, the flowcharts/sequence diagrams illustrate the method in terms of the steps required for understanding of aspects of the embodiments as disclosed herein. Furthermore, in terms of the construction of the device, one or more components of the device may have been represented in the drawings by conventional symbols, and the drawings may show only those specific details that are pertinent to understanding the embodiments so as not to obscure the drawings with details that will be readily apparent to those of ordinary skill in the art having the benefit of the description herein. Furthermore, in terms of the system, one or more components/modules which comprise the system may have been represented in the drawings by conventional symbols, and the drawings may show only those specific details that are pertinent to understanding the embodiments so as not to obscure the drawings with details that will be readily apparent to those of ordinary skill in the art having the benefit of the description herein.

The accompanying drawings are used to help easily understand various technical features and it should be understood that the embodiments presented herein are not limited by the accompanying drawings. As such, the disclosure should be construed to extend to any modifications, equivalents, and substitutes in addition to those which are particularly set out in the accompanying drawings and the corresponding description. Usage of words such as first, second, third etc., to describe components/elements/steps is for the purposes of this description and should not be construed as sequential ordering/placement/occurrence unless specified otherwise.

In general, Multi-SIM (MUSIM) devices that host more than one Subscriber Identity Modules (SIMs) to have a facility to connect to two or more different networks (NWs) in order to avail different data plans, have user profiles like home and office, increased connectivity/reliability with multiple connections etc. In order to save on the cost, a radio frequency (RF) circuitry used by a UE is common for multiple SIMs. It implies, multiple SIMs need to arbitrate and share the common Radio Frequency (RF) resource among themselves to perform their activities and/or avail services. Effectively, only one SIM and its associated protocol stack can be served in release 17 of third generation partnership project (3GPP) specifications. Meanwhile, all other SIMs and their associated protocol stacks will be waiting for the RF resource to be available for them. One or more of the multiple SIMs is engaged in paging reception, system information block (SIB) acquisition, measurement, data or voice call, Multimedia broadcast multicast service (MBMS), emergency call, access stratum (AS) signaling, Non-access stratum (NAS) signaling and so on.

The MUSIM UEs are operating without network control by creating arbitrary gaps till 3$^{rd}$ Generation Partnership Project (3GPP) decided to introduce support for MUSIM device operations in Release 17. From Release 17, a connected USIM (i.e., USIM in the context of the patent disclosure means radio protocol stack associated with the UE) in the MUSIM device can notify a connected mode network on network switching for multi-SIM operations. There are two types of network switching supported. In one type, connected USIM leaves the connected network and completely switches to other USIM, i.e. other USIM becomes connected. In other type, the connected USIM request for the gap from its network for the MUSIM operations like listening for paging or performing measurements in the idle USIM.

In release 17, the MUSIM UE uses Radio Resource Control (RRC) UE Assistance Information (UAI) procedure to request for the gaps or to notify about leaving. The network (e.g., gNB) configures the UE whether it can provide the assistance information for MUSIM gaps or MUSIM Leave using otherConfig in RRC messages. Musim-GapAssistanceConfig in otherConfig is used for informing the UE whether it can provide MUSIM assistance information for providing gap information. In release 17, only per-UE gaps are supported for MUSIM operations.

Below information is provided for providing the clarity with respect to the disclosure.

UE Capabilities: In a technology like Fifth Generation (5G) New radio (NR), different UEs may have different hardware and software capabilities. Varying capabilities across devices could be hardware capabilities including radio frequency capabilities like bands or band combinations supported, processing capabilities (e.g. baseband computational capabilities), software capabilities like the support of various features, layer 1 capabilities, layer 2 capabilities, layer 3 capabilities and so on. In general, the UE reports its UE radio access capabilities which are static at least when the network requests the capabilities. To limit signaling overhead, the gNB (e.g., 5G NR base station) can request the UE to provide NR capabilities for a restricted set of bands. When responding, the UE can skip a subset of the requested band combinations when the corresponding UE capabilities are the same. If supported by the UE and the network, the UE may provide an identifier (ID) in Non Access stratum (NAS) signaling that represents its radio capabilities for one or more RATs in order to reduce signaling overhead. The ID may be assigned either by a manufacturer or by a serving Public Land Mobile Network (PLMN). The manufacturer-assigned ID corresponds to a pre-provisioned set of capabilities. In the case of the PLMN-assigned ID, assignment takes place in NAS signaling. Detailed list of UE capabilities that are exchanged based on aforementioned methods is specified in 3GPP technical specifications like TS 38.306.

A 5G gNB provides the UE with various configurations/features through RRC messages like RRC reconfiguration or RRC resume based on the reported UE capability.

RRC States: In NR, the RRC can be in one of the three states—RRC_IDLE, RRC_INACTIVE or RRC_CONNECTED. The RRC_CONNECTED UE is in CM-CONNECTED (i.e. Connected to 5G Core network) and can do unicast and multicast/broadcast traffic with the network. The network stores a UE AS context, knows the UE at cell level and controls the UE mobility. The UE may perform measurements and report to the network, provides channel quality and feedback information etc.

RRC_INACTIVE is a state where the UE remains in CM-CONNECTED and can move within an area configured by a next generation radio access network (NG-RAN) (5G RAN consisting of gNB(s)) without notifying NG-RAN. In RRC_INACTIVE, the last serving gNB node keeps the UE context and the UE-associated NG connection (i.e. the connection to the core network). Since the RRC configurations and the connection to core network is kept in RRC_INACTIVE, the UE can transition immediately to the RRC connected state and perform data transfer with the core network/applications. The UE initiates transition to the RRC_CONNECTED from the RRC_INACTIVE by sending RRC resume request.

In RRC IDLE UE or the gNB doesn't store any Access Stratum (AS) context. The UE is in CM_IDLE (there is no connection to core network). The UE sets up a new connection by sending a RRC Setup Request message and the gNB sends a RRC setup message to transition to RRC connected. The UE and NW (both radio access network (RAN) and core network) exchanges messages to move the UE to CM_CONNECTED. The UE in the RRC_CONNECTED may send power head room to the network according to the TS 38.321 and other relevant 3gpp specs. The patent disclosure considers v17.3.0 of TS 38.321 as the relevant background.

Carrier Aggregation: In Carrier Aggregation (CA), two or more Component Carriers (CCs) are aggregated. The UE may simultaneously receive or transmit on one or multiple CCs depending on its capabilities: CA is supported for both contiguous and non-contiguous CCs. When CA is deployed frame timing and system frame number (SFN) are aligned across cells that can be aggregated (synchronous CA), or an offset in multiples of slots between the Pcell/PSCell and an Scell is configured to the UE (Asynchronous CA). The UE in inactive mode may store the CA configuration. In CA, Pcell or Primary Cell is the cell that is used for initial access while other cells are called Scells or secondary cells.

Multi-Radio Dual Connectivity: Dual connectivity or more technically multi-radio dual connectivity is specified by 3gpp in specifications such as TS 37.340. A summary of the details on dual connectivity are given below.

The NG-RAN supports Multi-Radio Dual Connectivity (MR-DC) operation whereby a user equipment (UE) in RRC_CONNECTED is configured to utilize radio resources provided by two distinct schedulers, located in two different NG-RAN nodes connected via a non-ideal backhaul, one providing NR (New Radio) access and the other one providing either Evolved UMTS Terrestrial Radio Access (E-UTRA) or NR access. One node acts as the master node (MN) and the other as the secondary node (SN). The MN and SN are connected via a network interface and at least the MN is connected to the core network. NG-RAN supports NG-RAN E-UTRA-NR Dual Connectivity (NGEN-DC), in which the UE is connected to one next generation evolved node B (ng-eNB) (a E-UTRA base station that can connect to 5G core) that acts as a MN and one gNB (5G base station) that acts as a SN. NG-RAN also supports NR-E-UTRA Dual Connectivity (NE-DC), in which the UE is connected to one gNB that acts as a MN and one ng-eNB that acts as a SN. A primary cell of a master or secondary cell group is called SpCell. SpCell of a master cell group is called Pcell while SpCell of a secondary cell group is called PSCell. In MR-DC, a group of serving cells associated with the Master Node, comprising of the SpCell (Pcell) and optionally one or more Scells is called MCG or Master Cell Group. A group of serving cells associated with the Secondary Node, comprising of the SpCell (PSCell) and optionally one or more Scells is known as Secondary Cell Group (SCG) in MR-DC. The Frame timing and SFN between the cells in MCG and SCG may not be aligned.

Framework for supporting capability change: Consider the case of a MUSIM UE with two USIMs (i.e. two UEs in same MUSIM device), UE-A (USIM-A) is in RRC-CONNECTED state with NWK-A. UE-B (USIM-B) is moving to RRC_CONNECTED or is transitioning to RRC_CONNECTED. UE-A provides the information to NWK-A to release some resources or update some parameters for the operation of UE-B. This information is pertaining to the change of some of the capabilities in UE-A, release of SCG or Scells in UE-A, deactivation of SCG or Scells in UE-A, information that SCG or Scells can be setup or activated in UE-A etc., measurement gaps requirements (needforgaps/needforgapsorncsg) related information in UE-A to facilitate operations of UE-B.

If the capability of UE-A needs to be changed due to UE-B, UE-A indicates the new capabilities to NW-A in RRC setup request/RRC resume request. Alternately, UE-A may also indicate just that the capability has changed in RRC setup request/RRC resume request. NW-A may request the UE-A to send the changed capabilities further and UE-A may report changed capability in RRC message like RRC setup complete or RRC resume complete. NW-A can configure the UE further with the changed capabilities.

When the UE-A is in RRC_CONNECTED mode and the UE capability changes due to activities in UE-B, UE-A informs NW-A about the capability change through a RRC message. This message could be UE Assistance Information or a new RRC message (for e.g. UE Capability update) or even any existing RRC message. UE-A may directly send the updated UE capabilities to the NW-A in the aforesaid RRC message. Alternatively, UE-A may just inform the network NW-A that the UE capability has changed, and NW-A retrieves the capability through UE capability retrieval procedure. NW-A sends RRC message like UE Capability enquiry to UE-A and UE-A sends updated capabilities in UE Capability Information. NW-A may store the received capability. To reduce the signaling overhead, UE-A may associate an id with each set of the capabilities and share the id along with the capability to NW-A. Thereafter, the UE-A can just share the capability id to indicate that the capability has changed and NW-A can retrieve the UE capability with the stored capabilities.

If the capability of UE-A has changed due to UE-B changing the RRC state when UE-A was in RRC_IDLE or RRC_INACTIVE mode, a similar approach as in RRC_CONNECTED can be used. UE-A indicates the new capabilities to NW-A in RRC messages like RRC setup request/RRC resume request or may share the UE capability Id. Alternately, UE-A may also indicate just that the capability has changed in RRC setup request/RRC resume request. NW-A may request the UE-A to send the changed capabilities further and UE-A may report changed capability in RRC message like RRC setup complete or RRC resume complete.

The UE-A may report that the capability has changed or may report the changed capabilities based on specific actions in UE-B. When UE-B is handed over from a licensed frequency to an unlicensed frequency or from one FR (frequency range) to another FR, UE-A may report the capability change to NW-A. In another embodiment, NW-A may configure UE-A about reporting the capabilities e.g. through "otherConfig" in the RRC Reconfiguration message. Accordingly, UE can report the updated or changed capabilities with UE assistance information message. The information contents in UAI can pertain to MUSIM assistance information or MUSIM UE capability information. A prohibit timer may be configured to control how frequently the UE can report the capability update. The capability update, for e.g. the scheduling pattern and/or time division duplex (TDD) uplink (UL)/downlink (DL) config information pertaining to the UE-B as capability limitation (e.g. number of transmit (Tx)/receive (Rx)) to UE-A are not static or fully prohibitive. So UE can initiate UAI while prohibit timer is not running to handle such updates.

The NW-A may configure UE-A with a filter and UE-A will report the change of capabilities based on the filter. For e.g. if a capability included in the filter changes, UE-A may report the capability change. If none of the capability in the filter changes due to UE-B actions, UE-A may not initiate the messages to indicate UE capability change. An example set of Ies that could be included in the filter can be requestedFreqBandsNR-MRDC, requestedCapabilityNR, eutra-nronly flag, and requestedCapabilityCommon, UE-CapabilityRequestFilterNR. Further, the source gNB and target gNB can exchange the changed capabilities and requested filter during a handover or transition from RRC_INACTIVE or any other Xn (Xn is the interface between two gNBs) UE information retrieval procedure.

The NW-A also may indicate if it supports one or more slices or services like V2X/MBS when simultaneous RRC connection are supported. UE-A may request/inform NW-A for releasing the said slice or service (or the RRC connection with NW-A) if the MUSIM device decides to allow establishing RRC connection for UE-B. If the device decides to proceed with service/slice in UE-A, UE-B RRC will inform the UE-B NAS that an RRC connection can't be established. If the UE-B NAS has requested the RRC Connection establishment due to a paging message, UE-B NAS may send busy indication to its AMF. In some implementations UE-B RRC may send the busy indication instead of UE-B NAS.

If the bands supported by the changed capability is different from the older capability, NW-A may reconfigure UE-A to release one or more Scells, SCG or perform handover etc. NW-A may configure UE-A to report any available measurements when the capabilities are changed. Since the changed capability can be different from older capability, NW-A may prefer to change the Scells or SCG rather than releasing them, or in a case perform handover to a different frequency. Measurements from the UE can aid the network to take such decisions.

Whenever an RRC_CONNECTED UE such as UE-A in our example reports the modified capabilities, it sends any available measurements to gNB (NW-A). Measurements may be sent in the same RRC message which reports change of capabilities or a different RRC message like measurement report may be send along with the RRC message which reports change of capabilities.

If any of the NAS capabilities changes due to UE-B changing RRC state, UE-A may send a NAS message like registration request and trigger a reregistration with the changed capabilities. As in the RRC case, if AMF can't support certain services with the capability change, device needs to prioritize between services of UE-A and UE-B.

The static or dynamic capability signaling reported by UE may include the below and many more:

- Number of Rx links
- Number of Tx links
- Number of MIMO layers
- Support for CA or DC on NW B
- Processing capability in terms of supportable component carriers or dual connectivity on NW A
- Request for at least one of configuration, activation, deactivation and release of one or more Scell/SCG on NW A
- Supported band(s) or band combination(s)
- UL or DL TDD configuration
- Scheduling information or configuration
- DRX configuration on NW B
- Measurement configuration on NW B
- IDC related configuration or parameters
- Power control or back-off parameters
- Measurement gap requirements The network utilizes the updated capability received from the UE and reconfigures the UE with updated parameters. Network may update configuration of dual connectivity, carrier aggregation, power control, interference coordination, DAPS (Dual Antenna Protocol Stack) configuration, number of layers etc. based on the capability information including supported bands, supported band combination, scheduling pattern and/or TDD UL/DL config information etc.

The network may receive the updated capabilities thus received as temporary UE capability and the procedure for receiving this temporary capability, such as mentioned above, as temporary UE capability change or temporary UE capability changes. When this procedure is used for MUSIM operations, this procedure may be referred as temporary UE capability change(s) for MUSIM. Temporary capability changes for MUSIM can also be reduction in temporary capability which is also known as restrictions in temporary capability. Temporary capability changes for MUSIM can also be increase in the temporary capabilities which will be also known as removal of restrictions in temporary capability. This temporary capability may not be stored in the core network. The UE capabilities stored in AMF and reported through UE Capability information procedure (as in 3gpp NR R17) can be referred as the permanent capabilities.

L3 Mobility and LTM: In wireless technologies like 5G NR, devices can move across different cells. Mobility is performed using a procedure called cell reselection in RRC_IDLE mode. Till NR R17, mobility is performed using a procedure called handover in RRC_CONNECTED mode. Network controlled mobility applies to UEs in RRC_CONNECTED. It requires explicit RRC signaling to be triggered by the gNB in NR. Handover in NR usually consists of three steps: handover preparation, handover execution and handover completion. gNB may configure the UE to report measurements and based on the reported measurements or based on its own understanding of the network topology, gNB will send RRC Reconfiguration message to handover the UE to another cell called target cell from the source cell. UE accesses the target cell and sends RRC Reconfiguration complete message. In an alternative way introduced in 3gpp NR release 16, gNB may configure the UE with the execution conditions for triggering handover and once the execution conditions are satisfied, the UE may move to target cell and sends the RRC Reconfiguration complete. 3gpp also introduced a new handover called DAPS handover in release 16. DAPS handover procedure maintains the source gNB connection after reception of the RRC message for handover and until releasing the source cell after successful random access to the target Gnb, in release 16. In case of the DAPS handover procedure, the UE continues the downlink user data reception from the source gNB until releasing the source cell and continues the uplink user data transmission to the source gNB until successful random access procedure to the target gNB. In all these methods, UE performs handover by sending layer 3 (RRC) messages which causes considerable signaling overhead and latency issues. The patent disclosure can refer to the handover, and conditional handover (CHO) as layer 3 mobility. In case of dual connectivity, UE may perform PSCellChange or Conditional PSCellChange. In the context of dual connectivity, the patent disclosure can refer PSCellChange or Conditional PSCellChange also as layer 3 mobility. i.e. Handover, Conditional Handover, PSCellChange, Conditional PSCellChange etc. refers to L3 mobility. In an embodiment refer PSCellChange or Conditional PSCellChange as SCG layer 3 mobility and the handover and CHO as MCG layer 3 mobility in the context of dual connectivity.

3gpp release 18 is considering Lower Layers (L1/L2 layers) Triggered Mobility, also known as LTM to solve the problem related to latency, signaling overhead etc. associated with layer 3 mobility. As per 3gpp, the goal of LTM is to enable a serving cell change via L1/L2 signaling, in order to reduce the latency, overhead and interruption time. Network (gNB) may configure the UE with multiple candidate cells to allow fast application of configurations for candidate cells. Network may further send MAC CE or L1 signaling to dynamically switch the UE from a source cell to one of the configured candidate cells. Further, LTM can be triggered based on L1 measurements rather than L3 measurements.

The 3GPP proposes to perform LTM, without reset of lower layers like MAC to avoid data loss and to reduce the additional delay of data recovery wherever it is possible.

Source gNB sends RRC Internode message HandoverPreparationInformation message to target gNB during handover. An example specification extract is given below:

This message is used to transfer the NR RRC information used by the target gNB during handover preparation or UE context retrieval, e.g. in case of resume or re-establishment, including UE capability information. This message is also used for transferring the information between the CU and DU.

Direction: source gNB/source RAN to target gNB or CU to DU.

Below are the handoverPreparationInformation message.

```
-- ASN1START
-- TAG-HANDOVER-PREPARATION-INFORMATION-START
HandoverPreparationInformation ::=          SEQUENCE {
  criticalExtensions                          CHOICE {
    cl                                          CHOICE{
      handoverPreparationInformation
HandoverPreparationInformation-IEs, spare3 NULL, spare2 NULL,
spare1 NULL
    },
    criticalExtensionsFuture                    SEQUENCE { }
  }
}
HandoverPreparationInformation-IEs ::=   SEQUENCE {
  ue-CapabilityRAT-List                      UE-CapabilityRAT-
                                             ContainerList,
  sourceConfig                                        AS-Config
OPTIONAL, -- Cond HO
  rrm-Config                                         RRM-Config
OPTIONAL,
  as-Context                                         AS-Context
OPTIONAL,
  nonCriticalExtension                           SEQUENCE   { }
OPTIONAL
}
-- TAG-HANDOVER-PREPARATION-INFORMATION-STOP
-- ASN1STOP
```

| HandoverPreparationInformation field descriptions |
|---|
| as-Context<br>Local RAN context required by the target gNB or DU. |
| rrm-Config<br>Local RAN context used mainly for RRM purposes. |
| sourceConfig<br>The radio resource configuration as used in the source cell. |
| ue-CapabilityRAT-List<br>The UE radio access related capabilities concerning RATs supported by the UE. A gNB that retrieves MRDC related capability containers ensures that the set of included MRDC containers is consistent with respect to the feature set related information. |
| ue-InactiveTime<br>Duration while UE has not received or transmitted any user data. Thus the timer is still running in case e.g., UE measures the neighbour cells for the HO purpose. Value s1 corresponds to 1 second, s2 corresponds to 2 seconds and so on. Value min1 corresponds to 1 minute, value min1s20 corresponds to 1 minute and 20 seconds, value min1s40 corresponds to 1 minute and 40 seconds and so on. Value hr1 corresponds to 1 hour, hr1min30 corresponds to 1 hour and 30 minutes and so on. |

In this disclosure, the 3gpp specifications, v17.3.0 of TS 38.300, TS38.331, TS38.321, TS 38.401 and TS 37.340, including the definitions and descriptions serve as background.

Considering the case of a MUSIM UE with two USIMs (i.e. two UEs in same MUSIM device), UE-A (USIM-A) is in RRC-CONNECTED state with NWK-A. UE-B (USIM-B) is in RRC_CONNECTED state with NWK-B or is moving to RRC_CONNECTED. The patent disclosure discusses various operations at NWK-A between different nodes in NWK-A and between NWK-A and UE-A for updating the temporary capability due to MUSIM operations.

Embodiments disclosed herein provide a method for handling a temporary UE capability change for a MUSIM UE in a wireless network. The method includes receiving, by a UE, an information from a network entity. The network entity broadcasts the information in a SIB indicating about whether the network entity supports a temporary UE capability change handling for a MUSIM operation in the wireless network. Further, the method includes handling, by the UE, the temporary UE capability changes for the MUSIM operation in the wireless network based on the broadcasted information.

Embodiments disclosed herein provide, a method and system for handling temporary UE capability changes for MUSIM. In an embodiment, a source network entity (source gNB in NR) generates UE-CapabilityRAT-List in HandoverPreparationInformation by applying the received temporary capability change to the (permanent) UE capabilities and sends to a target gNB. After reporting the temporary capability, UE accepts RRC message with configuration only when it is received according to the reported temporary capabilities. Otherwise the RRC procedure fails and UE initiates RRC Reestablishment procedure or move to RRC_IDLE. In an embodiment, NWK-A broadcasts whether it supports temporary UE capability change handling for MUSIM operations in a new system information. In an embodiment, UE-A updates its UE capabilities by applying the reduced temporary capability and informs the NWK-A.

In an embodiment, source gNB in the NWK-A is informed whether the target gNB supports the handling of temporary UE capability or temporary UE capability changes. In an embodiment, target gNB informs source gNB whether it supports the handling of temporary UE capability or temporary UE capability changes. In an embodiment, this would be done through Xn messages such as Xn setup message or Xn message for configuration update (NG-RAN NODE CONFIGURATION UPDATE or NG-RAN NODE CONFIGURATION UPDATE COMPLETE). In an embodiment, target gNB informs the source gNB about its capability through INM RRC messages. In an embodiment, Operations Administration and Maintenance (OAM) entity informs source gNB whether target gNB supports the handling of temporary UE capability or temporary UE capability changes. In an embodiment, source gNB may be configured whether target gNB supports the handling of temporary UE capability or temporary UE capability changes by operator.

In an embodiment, during the handover, the source gNB of NWK-A sends HandoverPreparationInformation to target gNB of NWK-A including the latest UE capability (permanent UE capability) and the request for temporary UE capability changes received from the UE-A. Request for temporary UE capability changes may be received in multiple messages, such as RRC messages like UAI or other RRC messages or through MAC CE. Source gNB sends thus received temporary UE capability changes to target gNB by including them in the INM messages such as Handover-Preparation Information.

In an embodiment, during the handover, the source gNB of NWK-A sends HandoverPreparationInformation to target gNB of NWK-A including the latest UE capability (permanent UE capability) and the request for temporary UE capability changes, same as received from the UE-A.

Referring now to the drawings, and more particularly to FIGS. 1A, 1B, and 2 to 13, where similar reference characters denote corresponding features consistently throughout the figures, there are shown embodiments.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

FIG. 1A is a block diagram illustrating a wireless network (1000) for handling a temporary UE capability change for a MUSIM operation, according to an embodiment of the disclosure.

Figure 1B:
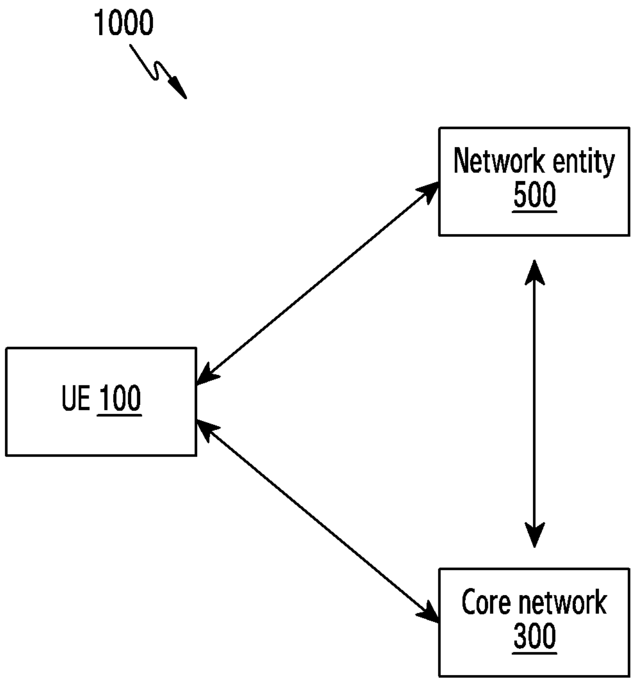
FIG. 1B is a block diagram illustrating the wireless network for handling the temporary UE capability change for the MUSIM operation, according to an embodiment of the disclosure.

FIG. 1B is a block diagram illustrating the wireless network (1000) for handling the temporary UE capability change for the MUSIM operation, according to an embodiment of the disclosure.

Referring to FIG. 1A, the UE (100) is communicated with the source network entity (200). The source network entity (200) is communicated with the target network entity (400) based on the requirement. Referring to FIG. 1B, the UE (100) is communicated with the network entity (500) and a core network (300). The network entity (500) is any one of: the source network entity (200) and the target network entity (400).

In general, the wireless network (1000) includes the UE (100), the source network entity (200), the core network (300) and the target network entity (400) having a plurality of target network entities (400*a*-400*n*). Hereafter, the label of the target network entity is 400.

The wireless network (1000) can be, for example, but not limited to a fourth generation (4G) network, a fifth generation (5G) network, a 6G network, an Open Radio Access Network (ORAN) or the like. The UE (100) can be, for example, but not limited to a laptop, a smart phone, a desktop computer, a notebook, a Device-to-Device (D2D) device, a vehicle to everything (V2X) device, a foldable phone, a smart TV, a tablet, an immersive device, and an internet of things (IoT) device. The source network entity (200) can be, for example, but not limited to a gNB, an eNB, a new radio (NR) trans-receiver or the like. The target network entity (400) can be, for example, but not limited to a gNB, an eNB, a new radio (NR) trans-receiver or the like.

In an embodiment, the network entity broadcasts an information whether the network entity supports a temporary UE capability change handling for a MUSIM operation in the wireless network (1000). The information includes a NR System Information Block (SIB). Based on the broadcasted information, the network entity handles the temporary UE capability changes for the MUSIM in the wireless network (1000).

In another embodiment, the target network entity (400) or the OAM entity informs to the source network entity (200), whether the target network entity (400) supports a handling of a temporary UE capability or temporary UE capability changes through one of a Xn message and an INM RRC message. based on one of the Xn message and the INM RRC message, the target network entity (400) or the OAM entity handles the temporary UE capability change for the MUSIM in the wireless network (1000).

Figure 7:
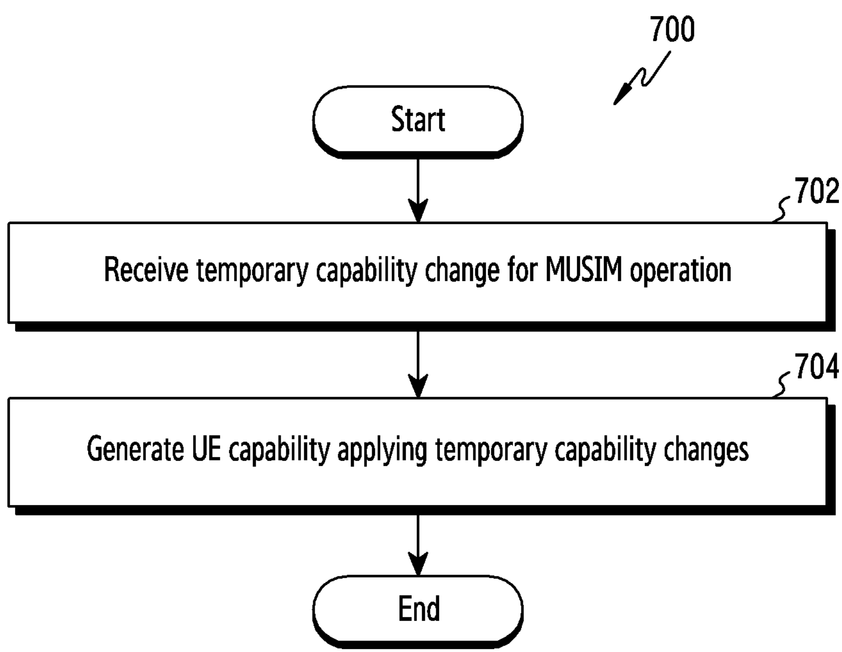
FIG. 7 illustrates a flow diagram of a source gNB informing UE capability to target gNB during handover according to temporary capabilities, according to an embodiment of the disclosure.

Referring to FIG. 7, in an embodiment, the source network entity (200) (e.g., source gNB in NR) generates a ue-CapabilityRAT-List in HandoverPreparationInformation by applying the received temporary capability to the (permanent) UE capabilities and sends to the target network entity (e.g., target gNB or the like) (400). The source network entity (200) (e.g., Source gNB or the like) updates the UE capabilities received from the core network (300) or the UE capabilities received through UE capability retrieval procedure or through HandoverPreparationInformation during a handover and so, according to the temporary UE capability changes requested by the UE (and accepted by gNB) and includes it in the ue-CapabilityRAT-List in HandoverPreparationInformation and sends to target gNB.

In an embodiment, if the target network entity (400) (e.g. target gNB in NR) doesn't support the handling of temporary UE capability or temporary UE capability changes, the source network entity (200) (e.g., source gNB in NR) generates ue-CapabilityRAT-List in HandoverPreparationInformation, by applying the received temporary capability to the (permanent) UE capabilities and sends to the target network entity (400). If the target network entity (400) doesn't support the handling of temporary UE capability or temporary UE capability changes, the source network entity (200) updates the UE capabilities received from the core network (300) or the UE capabilities received through UE capability retrieval procedure or through HandoverPreparationInformation and so during a handover, according to the temporary UE capability changes requested by the UE (200) and accepted by the gNB and includes it in the ue-CapabilityRAT-List in HandoverPreparationInformation and sends to the target network entity (400).

Power Headroom Reporting (PHR): In an embodiment, a UE-A sends UAI or other RRC message or MAC CE for informing/requesting/communicating temporary capability changes and receives confirmation/acknowledgment/corresponding configuration from the NWK-A in RRC messages such as RRC Reconfiguration message or in MAC CE and upon receiving the confirmation/acknowledgment/corresponding configuration from the NWK-A, UE-A sends Power Head Room MAC CE to NWK-A.

In an embodiment, upon temporary capability changes due to MUSIM operations, the UE (100) triggers PHR.

In an embodiment, the NWK-A configures the UE-A whether or how to report power head room (for e.g. based on the change in power headroom crossing a threshold) during temporary capability change procedure through a RRC message such as RRC Reconfiguration message. If the UE-A is configured for power headroom reporting during temporary capability change and the conditions for power headroom reporting during temporary capability change are satisfied, it reports PHR to NWK-A.

NeedForGaps: In an embodiment, the UE-A sends a flag which indicates that the measurement gap requirements have changed to the NWK-A in the RRC message for informing temporary UE capability change.

Reconfiguration handling: In an embodiment, the UE-A sends UAI or other RRC message or MAC CE for informing/requesting/communicating temporary capability changes and receives confirmation/acknowledgment/corresponding configuration from the NWK-A in RRC messages such as RRC Reconfiguration message or in MAC CE and switches a part of the capabilities for the operations in UE-B.

Figure 5:
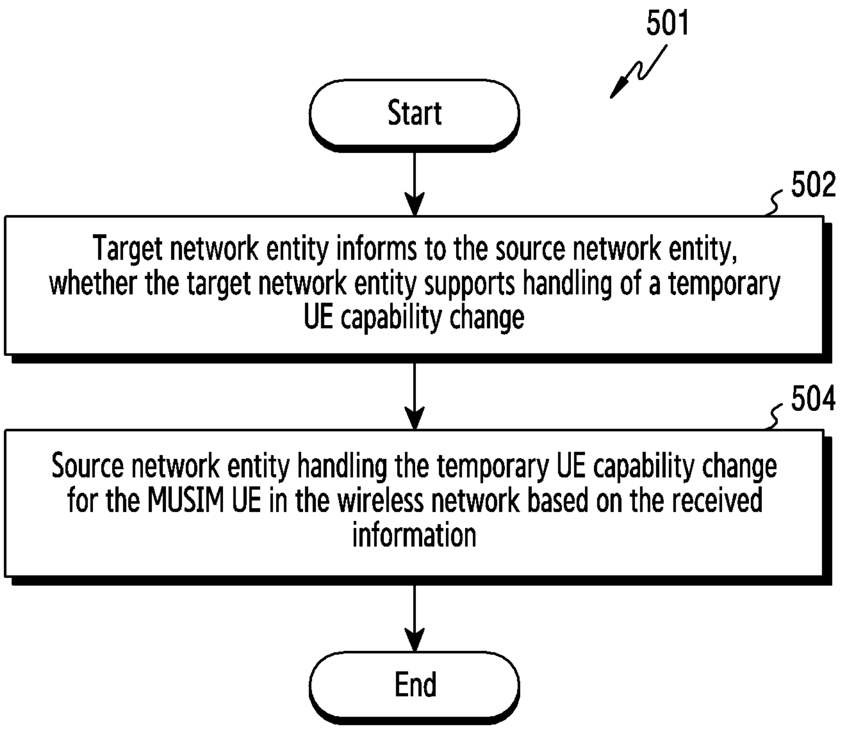
FIG. 5 is a flow chart illustrating a method, implemented by the wireless network, for handling a temporary UE capability change for a MUSIM UE in a wireless network, according to an embodiment of the disclosure.

If the UE-A receives a configuration (some IEs) in the RRC messages such as RRCReconfiguration or RRCResume which is not supported by the changed temporary capability, though it is supported in the permanent UE capability from the NWK-A, the UE-A fails the procedure (for e.g. as in FIG. 5.3.5.1-2: RRC reconfiguration, failure of TS 38.331 v17.3.0). Further, the UE-A initiates the RRC Reestablishment procedure.

If the UE-A sends UAI for informing/requesting/communicating temporary capability changes and UE-A receives confirmation/acknowledgment/corresponding configuration from the NWK-A in RRC messages such as RRCReconfiguration message and the UE (100) performs a handover or is moved to the RRC_INACTIVE or performs RRC Reestablishment procedure and receives a configuration (some IEs) which is not supported by the changed temporary capability (or UE receives a configuration (some IEs) which is not supported by the changed temporary capability before it moves out of RRC_CONNECTED), though it is supported in the permanent UE capability from the NWK-A, the UE-A fails the procedure (for e.g. as in FIG. 5.3.5.1-2: RRC reconfiguration, failure of TS 38.331 v17.3.0). Further, the UE-A initiates a RRC Reestablishment procedure.

Figure 8:
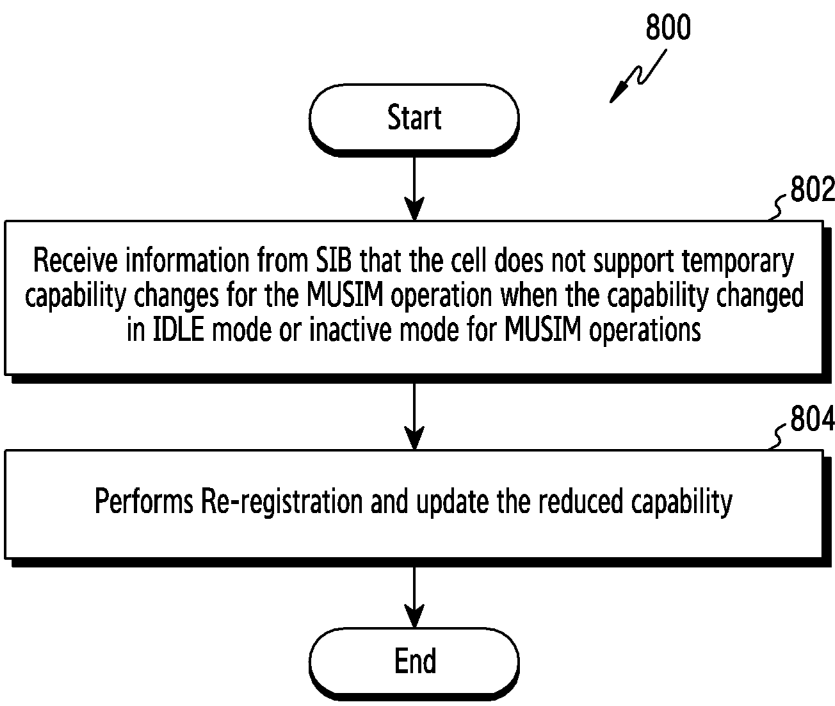
FIG. 8 illustrates a flow diagram of a UE handling capability change in an RRC_IDLE mode, according to an embodiment of the disclosure.

Referring to FIG. 8, the UE (100) receives the information from SIB that the cell doesn't support temporary capability change for the MUSIM operation when the capability changed in idle or inactive for MUSIM operations. The UE (100) performs the re-registration and update the reduced capability to the network.

Figure 9:
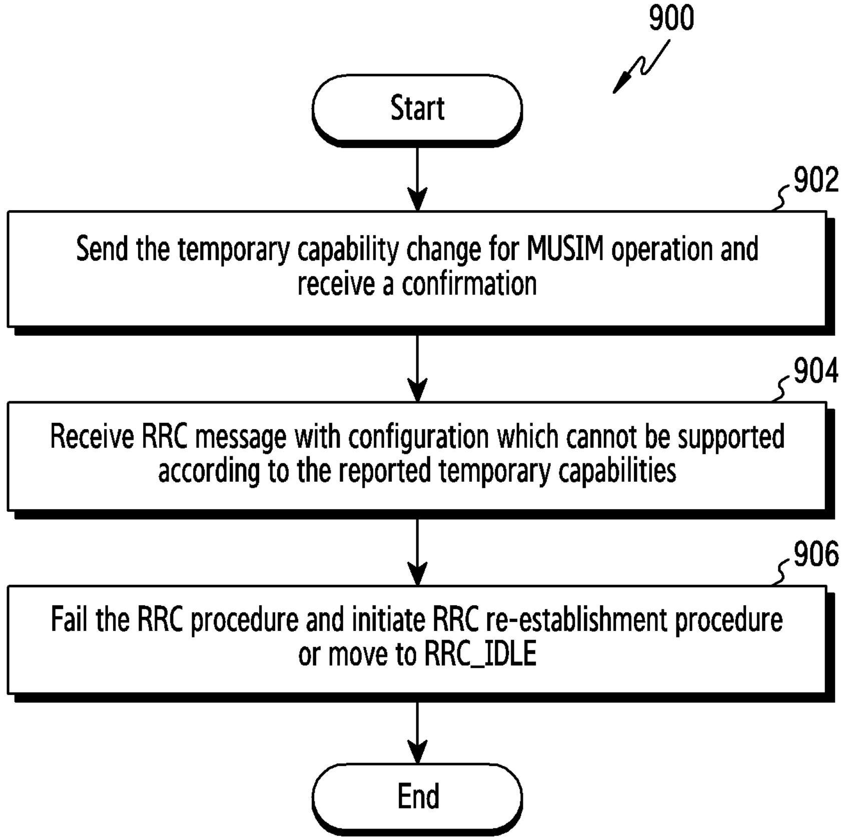
FIG. 9 illustrates a flow diagram of RRC Configuration handling with temporary capabilities, according to an embodiment of the disclosure.

Referring to FIG. 9, if the UE-A sends the UAI for informing/requesting/communicating temporary capability changes and the UE-A receives confirmation/acknowledgment/corresponding configuration from the NWK-A in the RRC messages such as RRCReconfiguration message and the UE (100) performs a RRC Reestablishment and receives the configuration (some IEs) which is not supported by the changed temporary capability, though it is supported in the permanent UE capability from the NWK-A, the UE-A fails the RRC Reestablishment procedure and moves to the RRC-IDLE.

If the UE-A sends the UAI for informing/requesting/communicating temporary capability changes for MUSIM operations and the UE-A receives confirmation/acknowledgment/corresponding configuration from the NWK-A in the RRC messages such as RRCReconfiguration message and the UE (100) receives a configuration (some IEs) which is not supported by the changed temporary capability before it is moved out of RRC_CONNECTED, though the configuration received from NWK-A is supported in the permanent UE capability from the NWK-A, UE-A fails the procedure (for e.g. as in FIG. 5.3.5.1-2: RRC reconfiguration failure of TS 38.331 v17.3.0) and further initiates a RRC Reestablishment procedure where as if the UE sends UAI for informing temporary capability changes for other operations such as UE power saving etc. UE-A receives confirmation/acknowledgment/corresponding configuration from the NWK-A in RRC messages such as RRCReconfiguration message and the UE receives a configuration (some IEs) which is not supported according to the UAI send for power savings, UE considers the procedure as success and sends RRC Reconfiguration Complete.

If the UE-A sends the UAI for informing/requesting/communicating temporary capability changes and UE-A receives confirmation/acknowledgment/corresponding configuration from the NWK-A in RRC messages such as RRCReconfiguration message and the UE receives a configuration (some IEs) which is not supported by the changed temporary capability before it moves out of RRC_CONNECTED, though it is supported in the permanent UE capability from the NWK-A, UE-A fails the procedure (for e.g. as in FIG. 5.3.5.1-2: RRC reconfiguration, failure of TS 38.331 v17.3.0). Further, the UE-A initiates a RRC Reestablishment procedure.

In an embodiment, the UE-A which is in RRC_INACTIVE moves to RRC_IDLE if the UE-A capabilities change (temporary UE capability change for MUSIM operation). In an embodiment, UE-A which is in RRC_INACTIVE initiates NAS recovery procedure upon the UE-A capabilities change. In an embodiment, the UE-A initiate's re-registration with the NAS upon the UE-A capabilities change and sends NAS registration request message.

When the UE-A receives a RRC reconfiguration message to which it cannot comply due to temporary capability change for MUSIM operation, the UE initiates re-establishment procedure. In an embodiment, if the reestablishment procedure was initiated due to reconfiguration failure due to MUSIM operation, the UE-A indicates to NW-A as part of RRCReestablishmentComplete message that the reconfiguration failure was due to temporary change in capabilities. In an embodiment, the NW-A initiates one or combination of following procedures to collect the changed capability from the UE (100) to perform reconfiguration:

UE capability enquiry procedure and/or a new procedure to enquire about the temporary capability from the UE and/or UE Assistance Information Request procedure to get the temporary or preferred capability from the UE.

```
RRCReestablishmentComplete-v1610-IEs ::=      SEQUENCE {
  ue-MeasurementsAvailable-r16              UE-MeasurementsAvailable-r16
OPTIONAL,
  nonCriticalExtension                      RRCReestablishmentComplete-v18-
IEs                     OPTIONAL
}
RRCReestablishmentComplete-v18-IEs ::=      SEQUENCE {
  musimReconfigFailure                      ENUMERATED {TRUE}
     OPTIONAL,
  nonCriticalExtension                      SEQUENCE { }           OPTIONAL
}
```

In another embodiment, the UE (100) includes the temporary capabilities as part of RRCReestablishmentComplete and NW-A uses this temporary capability for performing further reconfigurations.

```
RRCReestablishmentComplete-v1610-IEs ::=      SEQUENCE {
  ue-MeasurementsAvailable-r16              UE-MeasurementsAvailable-r16
OPTIONAL,
  nonCriticalExtension                      RRCReestablishmentComplete-v18-
IEs                     OPTIONAL
}
RRCReestablishmentComplete-v18-IEs ::=      SEQUENCE {
  tempUECapability-r18                      OCTET STRING      OPTIONAL,
  nonCriticalExtension                      SEQUENCE { }           OPTIONAL
}
```

Alternatively, a new reestablishment cause is introduced, musimReconfigFailure to indicate that the reconfiguration failed due to temporary capability restriction for MUSIM operation.

```
ReestablishmentCause ::=        ENUMERATED {reconfigurationFailure,
handoverFailure, otherFailure, musimReconfigFailure }
```

In an embodiment, the NWK-A broadcasts whether it supports temporary UE capability change handling for MUSIM operations. In an embodiment, the NWK-A broadcasts whether it supports temporary UE capability change handling for MUSIM operations in an existing NR SIB (e.g. SIB2 or SIB1). In an embodiment, the NWK-A broadcasts whether it supports temporary UE capability change handling for MUSIM operations in a new system information.

In an embodiment, if the UE-A whose capability has changed while it was in RRC_INACTIVE or RRC_IDLE initiates RRC Connection Setup in NR into a cell which doesn't support the temporary UE capability change, UE-A performs re-registration (reattach, sends NAS Registration Request) with the NWK-A core network. UE-A informs the updated UE capabilities to NWK-A during the registration procedure. UE-A updates its UE capabilities by applying the changed temporary capability and informs the NWK-A.

In an embodiment, if the UE-A whose capability has reduced while it was in RRC_INACTIVE or RRC_IDLE state due to temporary UE capability change initiates RRC Connection Setup in NR into a cell which doesn't support the temporary UE capability change, UE-A performs re-registration (reattach, sends NAS Registration Request) with the NWK-A core network. UE-A informs the updated UE capabilities to NWK-A during the registration procedure. UE-A updates its UE capabilities by applying the reduced temporary capability and informs the NWK-A.

In an embodiment, if the UE-A whose capability has increased while it was in RRC_INACTIVE or RRC_IDLE due to temporary UE capability change initiates RRC Connection Setup in NR into a cell which doesn't support the temporary UE capability change, UE-A avoids performing re-registration (reattach, sends NAS Registration Request) with the NWK-A core network.

Figure 10:
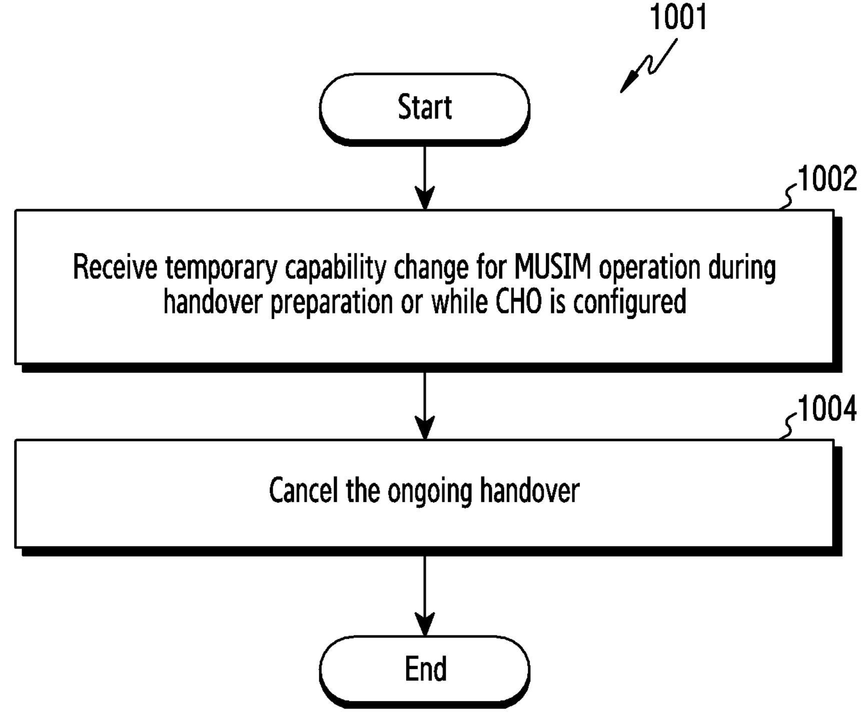
FIG. 10 is a flowchart depicting the process of handling concurrency for handover and temporary capability change, according to an embodiment of the disclosure.

As shown in FIG. 10, process for handling concurrency for handover and temporary capability change is depicted. In an embodiment, the source network entity (200) (such as gNB in NR) in the NWK-A (which receives a request for temporary capability change for MUSIM operation (UAI or other RRC/MAC CE etc.) while the handover is ongoing (for e.g., while handover preparation or handover execution (as described in TS 38.300, TS 38.401, TS 38.331 etc.) is ongoing), cancels the ongoing handover. In an embodiment, when the aforementioned handover is an Inter-gNB handover, the source gNB sends a Xn Handover Cancel message to the target gNB to cancel the handover. In an embodiment, the aforementioned behavior is applied only when the request is for reduction (decrease) in the capabilities. In an embodiment, the aforementioned behavior is applied when the request is for a decrease or increase in the capabilities. In an embodiment, the same behavior is applied also for PSCell Change in dual connectivity.

In an embodiment, the source network entity (200) (such as gNB in NR) in the NWK-A which receives a request for temporary capability change for MUSIM operation (UAI or other RRC/MAC CE etc. as mentioned in above) while handover is ongoing (for e.g., while handover preparation or handover execution (as described in TS 38.300, TS 38.401, TS 38.331 etc.) is ongoing), ignores the received message and proceeds with the handover. In an embodiment, the aforementioned behavior is applied only when the request is for an increase in the capabilities. In an embodiment, the aforementioned behavior is applied when the request is for a decrease or an increase in the capabilities. In an embodiment, the same behavior is applied also for PSCell Change in dual connectivity. In an embodiment, for PSCell Change, instead of ignoring the received message, the Master node sends the message to the SN after the handover.

In an embodiment, the UE (100) (which has sent a request for temporary capability change for MUSIM operation (UAI or other RRC/MAC CE etc. as mentioned in background)) and has received a request from the network for handover (for e.g., RRC Reconfiguration including Reconfiguration-withSync) or any other mobility to another PCell (for e.g., LTM) retransmits the request if the handover occurs within a pre-defined time (such as 1 second). In an embodiment, the UE (100) retransmits the above request irrespective of any timer prohibiting such a transmission is running. In an embodiment, the UE (100) retransmits the above request irrespective of any other conditions prohibiting such a transmission is existing. In an embodiment, the UE (100) modifies the aforementioned request based on the new cell's configuration and requests and retransmits the request. In an embodiment, the UE (100) retransmits the above request irrespective of any timer prohibiting such a transmission is running or any condition prohibiting such a transmission is existing. In an embodiment, the same behavior is applied also for PSCell Change in dual connectivity.

In an embodiment, the source network entity (200) (such as gNB in NR) in the NWK-A (which receives a request for temporary capability change for MUSIM operation (UAI or other RRC/MAC CE etc.)), while the conditional handover is configured or the LTM is configured, cancels the conditional handover or LTM respectively. In an embodiment, when the aforementioned handover is an Inter-gNB handover, the source network entity (200) sends the Xn Handover Cancel message to the target network entity (400) to cancel the handover. The source network entity (200) also sends the RRC Reconfiguration message to release any configured conditional handover at the UE (100). In an embodiment, the aforementioned behavior is applied when the request is only for a reduction (decrease) in the capabilities. In an embodiment, the aforementioned behavior is applied when the request is for a decrease or increase in the capabilities. In an embodiment, the same behavior is applied for conditional PSCell Change in dual connectivity.

In an embodiment, the source network entity (200) (such as gNB in NR) in the NWK-A (which receives a request for temporary capability change for MUSIM operation (UAI or other RRC/MAC CE etc.)) while conditional handover is configured (as described in TS 38.300, TS 38.401, TS 38.331 etc.) or the LTM is configured, ignores the received message. In an embodiment, the aforementioned behavior is applied when the request is only for an increase in the capabilities. In an embodiment, the aforementioned behavior is applied when the request is for a decrease or increase in the capabilities. In an embodiment, the same behavior can be applied for conditional PSCell Change in dual connectivity.

In an embodiment, the UE (100) which has send a request for temporary capability change for MUSIM operation (UAI or other RRC/MAC CE etc.)) and has executed conditional handover or received cell switch command for LTM retransmits the request if the conditional handover execution or reception of cell switch command for LTM occurs within a pre-defined time (such as 1 second). In an embodiment, the UE retransmits the above request irrespective of any timer prohibiting such a transmission is running. In an embodiment, the UE retransmits the above request irrespective of any other condition prohibiting such a transmission is existing. In an embodiment, the UE modifies the aforementioned request based on the new cell's configuration and requests and retransmits the request. In an embodiment, the same behavior can be applied for conditional PSCell Change in dual connectivity.

In an embodiment, the master node (MN such as gNB in NR-NR DC) in the NWK-A which receives a request for temporary capability change for MUSIM operation (UAI or other RRC/medium access control (MAC) control element (CE) etc.)) while PSCell Addition is ongoing or conditional PSCell Addition (CPA) is configured or PSCell Change is ongoing or conditional PSCell Change is configured, cancels the ongoing PSCell addition or configured PSCell Addition or the ongoing PSCell Change or configured PSCell Change. In an embodiment, the aforementioned behavior is applied only when the request is for a reduction (decrease) in the capabilities. In an embodiment, the aforementioned behavior is applied when the request is for a decrease or increase in the capabilities.

In an embodiment, the master node (MN such as gNB in NR-NR DC) in the NWK-A which receives a request for temporary capability change for MUSIM operation (UAI or other RRC/MAC CE etc.)) while PSCell Addition is ongoing or conditional PSCell Addition (CPA) is configured or PSCell Change is ongoing or conditional PSCell Change is configured, responds to the UE accepting the request. The Master Node may further inform the SN about the changed capabilities once the PSCell addition is completed or CPA execution is completed or the PSCell change is completed or CPC execution is completed. In an embodiment, the aforementioned behavior is applied when the request is for an increase in the capabilities. In an embodiment, the aforementioned behavior is applied when the request is for a decrease or increase in the capabilities.

DAPS Handover and Temporary Capability Change Reporting

In an embodiment, if the UE performs DAPS handover, the UE releases the configuration configured by the source gNB for temporary capability change reporting or reporting of band conflicts for MUSIM.

In an embodiment, if the DAPS bearer is configured, the target gNB skips configuring the UE with the configuration for temporary capability change reporting for MUSIM or reporting of band conflicts till DAPS bearer is released.

In an embodiment, the source gNB releases a configuration for temporary capability change reporting for MUSIM or reporting of band conflicts on or before configuring DAPS bearer.

An example specification change for the above embodiment as per 3gpp specification TS 38.300 is given below.

Only the source and target PCell are used during DAPS handover. CA, DC, SUL, multi-TRP, EHC, CHO, UDC, NR sidelink configurations, V2X sidelink configurations and the configuration for temporary capability change reporting or reporting of band conflicts for MUSIM are released by the source gNB before the handover command is sent to the UE and are not configured by the target gNB until the DAPS handover has completed (i.e., at earliest in the same message that releases the source PCell).

In an embodiment, the aforementioned behavior is applicable if the UE is configured for moving to RRC_IDLE (or if the UE will move to RRC_IDLE) when there is no response from network for temporary capability change.

Handling of timeout for the request to release the capabilities: In an embodiment, the UE (UE-A) which is configured for temporary capability change reporting for MUSIM may be configured with a timer by the network (for e.g., musim-LeaveWithoutResponseTimerforCapability-Change or musim_WaitTimer). The UE-A starts the timer, while initiating the transmission of the request for the temporary capability change to NWK-A. Upon expiry of the timer, if the UE-A has not received a response from the NWK-A (or if the network has not reconfigured, the UE according to the changed capabilities or in more specific cases, if the network has not been reconfigured the UE according to the changed capabilities when the existing configuration cannot handle the changed temporary capabilities), the UE-A moves to RRC-IDLE state. In an embodiment, for a NR UE, the UE-A moves to RRC-IDLE as defined in clause 5.3.8.6 of TS 38.331. In yet another embodiment, upon expiry of the timer, the UE applies the requested temporary capability itself.

In an embodiment, musim-LeaveWithoutResponseTimerforCapabilityChange is the same timer as NR timer musim-LeaveWithoutResponseTimer as defined in NR TS 38.331 V17.3.0 specifications In an embodiment, musim-LeaveWithoutResponseTimerforCapabilityChange is a new RRC timer.

In an embodiment, the UE-A stops musim-LeaveWithoutResponseTimerforCapabilityChange upon receiving a RRC message such as RRC Reconfiguration from the network or a MAC CE which indicates that the network has accepted UE's request. In an embodiment, this may be a NR RRC reconfiguration message which reconfigures the UE according to the changed capabilities.

In an embodiment, the UE-A starts the timer musim-LeaveWithoutResponseTimerforCapabilityChange only when the temporary capability change leads to the reduction (decrease) of the capabilities. The reduction of capabilities in this case may be release of SCG, release of SCells, reduction in the number of MIMO layers or the RX bandwidth etc.

In an embodiment, the UE-A starts the timer musim-LeaveWithoutResponseTimerforCapabilityChange only when the temporary capability change leads to the reduction (decrease) or increase of the capabilities. In yet another embodiment, the UE may not move to RRC_IDLE if the expiry of the musim-LeaveWithoutResponseTimerforCapabilityChange is for the request which informed NWK-A about increase in the capabilities.

In an embodiment, the UE-A starts the timer musim-LeaveWithoutResponseTimerforCapabilityChange only when the UE-A is unable to handle the current configuration according to the temporary capability change. In yet another embodiment, the UE-A may start the timer but not move to RRC_IDLE if it is able to handle the current configuration even with the temporary capability change.

In an embodiment, the UE-A informs its preferred action (i.e., action it may perform) to the network if the network does not accept (or respond for or configure UE-A according to the changed temporary capabilities) for the change in temporary capabilities. In an embodiment, the UE-A informs the network that its preference is to leave the NWK-A (or it plans to leave NWK-A or it will leave NWK-A), in case the NWK-A does not accept (or respond for or configure UE-A according to the changed temporary capabilities etc.) the request for reconfiguration as per the temporary capability change. In yet another embodiment, the UE-A informs the network that its preferred action is to apply temporary capability restriction upon the expiry of the timer. This behavior may be present if the UE-B operation for which the UE-A sends temporary capability change is considered as more important by MUSIM device than the UE-A operation.

In an embodiment, if NWK-A does not accept (or respond for or configure the UE-A according to the changed temporary capabilities etc.), the change in temporary capabilities after the UE-A has informed the preferred action to NWK-A as leaving the network (i.e., MUSIM device prefers UE-B more), the UE-A moves to RRC_IDLE.

In an embodiment, the UE-A starts the timer musim-LeaveWithoutResponseTimerforCapabilityChange, if the UE prefers to leave NWK-A when the change is temporary capabilities is not accepted (or respond for or configure UE-A according to the changed temporary capabilities) by the NWK-A and leaves NWK-A on timer expiry.

The temporary capability change (change in temporary capabilities) and the related methods in the disclosure are mainly applicable for MUSIM scenario. But embodiments herein do not preclude the usage of temporary capability change for any other scenarios. Similarly the embodiments do not preclude the use of methods for any technology such as 4G LTE or 6G etc.

Further any embodiment applicable for NWK-A is applicable for NWK-B as well. I.e. both the network are interchangeable for this disclosure, in some of the embodiments.

Further any embodiment applicable for UE-A is applicable for UE-B as well. I.e. both the UEs are interchangeable for this disclosure, in some of the embodiments.

Figure 2:
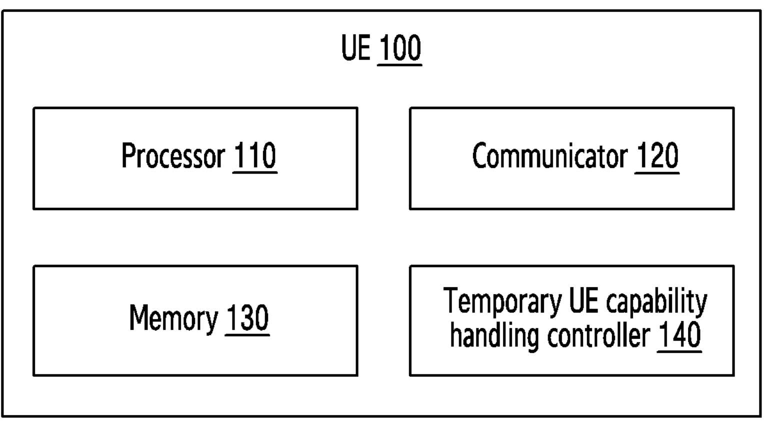
FIG. 2 shows various hardware components of a UE, according to an embodiment of the disclosure.

FIG. 2 shows various hardware components of the UE (100), according to an embodiment of the disclosure.

In an embodiment, the UE (100) includes a processor (110), a communicator (120), memory (130) and a temporary UE capability handling controller (140). The processor (110) is coupled with the communicator (120), the memory (130) and the temporary UE capability handling controller (140).

The temporary UE capability handling controller (140) receives the information from the network entity (500). The network entity (500) broadcasts the information in the SIB indicating about whether the network entity supports a temporary UE capability change handling for the MUSIM operation in the wireless network (1000). Based on the received information, the temporary UE capability handling controller (140) handles the temporary UE capability changes for the MUSIM operation in the wireless network (1000).

In an embodiment, the temporary UE capability handling controller (140) determines that the capability has reduced while the UE is in an RRC_INACTIVE state or an RRC_IDLE state. Further, the temporary UE capability handling controller (140) performs the re-registration with the core network (300) upon initiating the RRC connection setup procedure in a cell wherein the cell doesn't support the temporary UE capability change based on the determination. Further, the temporary UE capability handling controller (140) informs the updated UE capability to the core network (300) during the registration procedure by applying the reduced temporary capability.

In another embodiment, the temporary UE capability handling controller (140) receives the configuration for reporting temporary capability changes where the configuration comprises a timer (e.g., RRC timer or the like). Further, the temporary UE capability handling controller (140) determines that the capability has reduced while the UE (100) is in an RRC_INACTIVE state or an RRC_IDLE state. Further, the temporary UE capability handling controller (140) initiates the transmission to request for the temporary capability change based on the reduced capabilities as a result of determination. Further, the temporary UE capability handling controller (140) starts the timer. In an embodied, the UE (100) starts the timer when the UE (100) is unable to handle a current configuration based on the reduced temporary capability. For e.g. if the request for temporary capability changes include a request to release SCG or a serving cell or reduce the capabilities within a serving cell or SCG, UE may start the timer. If the request for temporary capability changes include only the request for reducing capability of some bands or band combinations, UE may skip starting the timer. Further, the temporary UE capability handling controller (140) receives the RRCReconfiguration message. In an embodiment, the temporary UE capability handling controller (140) stops the timer if the reconfiguration message reconfigures the UE (100) based on the requested reduced capabilities. In another embodiment, the temporary UE capability handling controller (140) continues the timer if the reconfiguration message does not reconfigure the UE (100) based on the requested reduced capabilities. For example, if the UE has requested for releasing SCG and an SCell and the reconfiguration is for just releasing the SCG, the time continues to run. Similarly if the UE has requested for reducing the maximum MIMO layers in two SCells and the reconfiguration releases for both the SCells, UE stops the timer. This ensures that the UE can gracefully allocate some resources for the other UE during MUSIM operations.

The temporary UE capability handling controller (140) is implemented by analog and/or digital circuits such as logic gates, integrated circuits, microprocessors, microcontrollers, memory circuits, passive electronic components, active electronic components, optical components, hardwired circuits and the like, and may optionally be driven by firmware.

The processor (110) may include one or a plurality of processors. The one or the plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor (110) may include multiple cores and is configured to execute the instructions stored in the memory (130).

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

In an embodiment, the communicator (120) includes an electronic circuit specific to a standard that enables wired or wireless communication. The communicator (120) is configured to communicate internally between internal hardware components of the UE (100) and with external devices via one or more networks.

Although the FIG. 2 shows various hardware components of the UE (100) but it is to be understood that other embodiments are not limited thereon. In other embodiments, the UE (100) may include less or more number of components. Further, the labels or names of the components are used only for illustrative purpose and does not limit the scope of the disclosure. One or more components can be combined together to perform same or substantially similar function in the UE (100).

Figure 3:
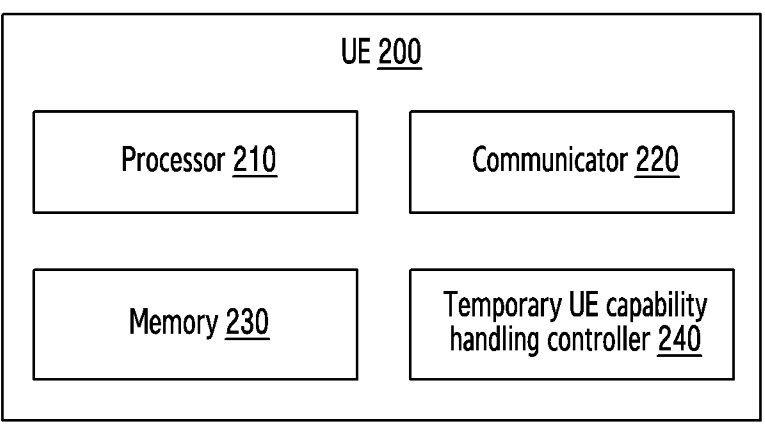
FIG. 3 shows various hardware components of a source network entity, according to an embodiment of the disclosure.

FIG. 3 shows various hardware components of the source network entity (200), according to an embodiment of the disclosure.

In an embodiment, the source network entity (200) includes a processor (210), a communicator (220), memory (230) and a temporary UE capability handling controller (240). The processor (210) is coupled with the communicator (220), the memory (230) and the temporary UE capability handling controller (240).

The temporary UE capability handling controller (240) configures the configuration for reporting temporary capability changes at the UE (100). Further, the temporary UE capability handling controller (240) receives a request for temporary capability change for the MUSIM operation while a handover is ongoing. In an embodiment, the temporary UE capability handling controller (240) sends a Xn Handover cancel message to the target network entity (400) to cancel the handover when the handover is an Inter-gNB handover. In another embodiment, the temporary UE capability handling controller (240) releases a conditional handover configuration at the UE and target gNB.

In an embodiment, the temporary UE capability handling controller (240) releases the configuration for reporting temporary capability changes before executing a Dual Active Protocol Stack (DAPS) handover.

In an embodiment, the temporary UE capability handling controller (240) sends the HandoverPreparationInformation to the target network entity (400). The HandoverPreparationInformation includes the permanent UE capability and the request for temporary UE capability changes received from the UE. The request for temporary UE capability changes is received in a RRC message. Based on the HandoverPreparationInformation, the temporary UE capability handling controller (240) handles the temporary UE capability changes for the MUSIM UE in the wireless network (1000).

The temporary UE capability handling controller (240) is implemented by analog and/or digital circuits such as logic gates, integrated circuits, microprocessors, microcontrollers, memory circuits, passive electronic components, active electronic components, optical components, hardwired circuits and the like, and may optionally be driven by firmware.

The processor (210) may include one or a plurality of processors. The one or the plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The processor (210) may include multiple cores and is configured to execute the instructions stored in the memory (230).

Further, the processor (210) is configured to execute instructions stored in the memory (230) and to perform various processes. The communicator (220) is configured for communicating internally between internal hardware components and with external devices via one or more networks. The memory (230) also stores instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

In an embodiment, the communicator (220) includes an electronic circuit specific to a standard that enables wired or wireless communication. The communicator (220) is configured to communicate internally between internal hardware components of the UE (100) and with external devices via one or more networks.

Referring to FIG. 3 shows various hardware components of the source network entity (200) but it is to be understood that other embodiments are not limited thereon. In other embodiments, the source network entity (200) may include less or more number of components. Further, the labels or names of the components are used only for illustrative purpose and does not limit the scope of the disclosure. One or more components can be combined together to perform same or substantially similar function in the source network entity (200).

Figure 4:
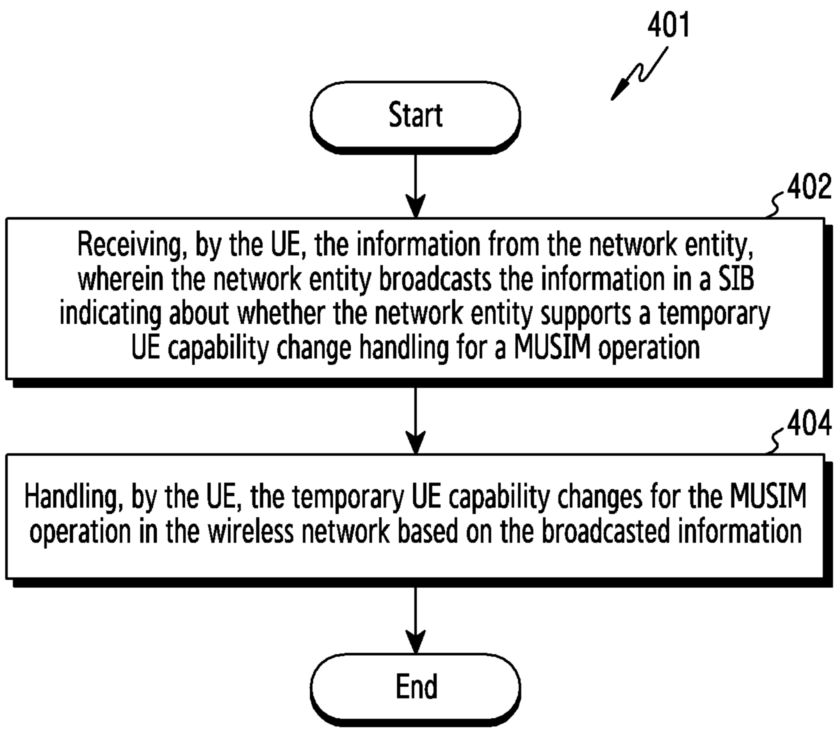
FIG. 4 is a flow chart illustrating a method, implemented by the UE, for handling a temporary UE capability change for a MUSIM UE in a wireless network, according to an embodiment of the disclosure.

FIG. 4 is a flow chart (401) illustrating a method, implemented by the UE (100), for handling the temporary UE capability change for the MUSIM operation in the wireless network (1000), according to an embodiment of the disclosure.

The operations 402 and 404 are handled by the temporary UE capability handling controller (140).

At operation 402, the method includes receiving the information from the network entity. The network entity broadcasts the information in a SIB indicating about whether the network entity supports a temporary UE capability change handling for a MUSIM operation. At operation 404, the method includes handling the temporary UE capability changes for the MUSIM operation in the wireless network (1000) based on the broadcasted information.

FIG. 5 is a flow chart (501) illustrating a method, implemented by the wireless network (1000), for handling the temporary UE capability change for the MUSIM UE in the wireless network (1000), according to an embodiment of the disclosure.

At operation 502, a target network entity (400) informs to the source network entity (200), whether the target network entity (400) supports handling of a temporary UE capability change. At operation 504, the source network entity (200) handling the temporary UE capability change for the MUSIM UE in the wireless network (1000) based on the received information.

Figure 6:
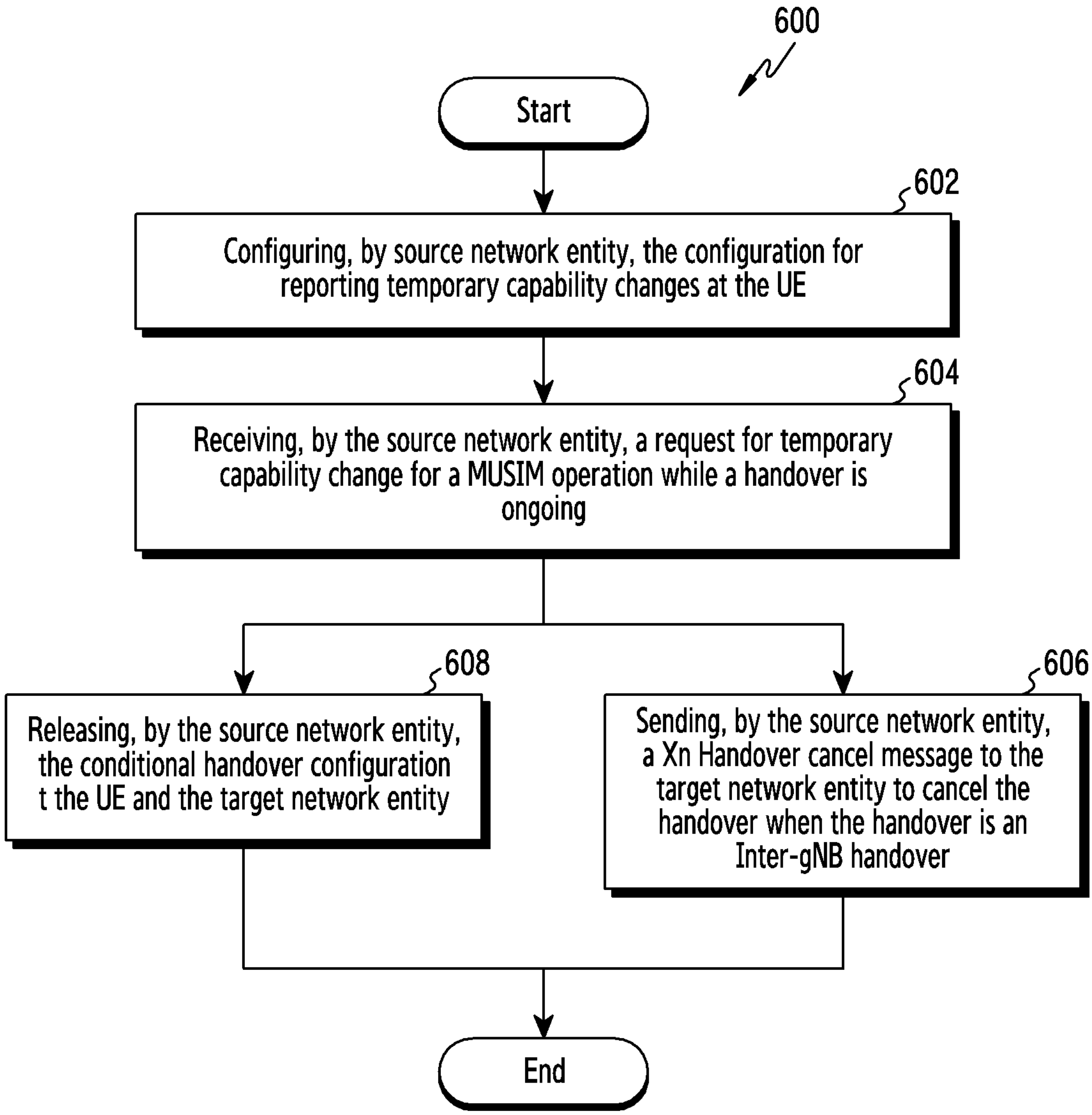
FIG. 6 is a flow chart illustrating a method, implemented by the source network entity, for handling a temporary UE capability change for a MUSIM UE in a wireless network, according to an embodiment of the disclosure.

FIG. 6 is a flow chart (600) illustrating a method, implemented by the source network entity (200), for handling the temporary UE capability change for the MUSIM operation in the wireless network (1000), according to an embodiment of the disclosure. The operations (602 to 608) are handled by the temporary UE capability handling controller (240).

At operation 602, the method includes configuring the configuration for reporting temporary capability changes at the UE (100). At operation 604, the method includes receiving a request for temporary capability change for a MUSIM operation while the handover is ongoing. In an embodiment, at operation 606, the method includes sending a Xn Handover cancel message to the target network entity (400) to cancel the handover when the handover is an Inter-gNB handover. In another embodiment, at operation 608, the method includes releasing the conditional handover configuration at the UE and the target network entity (200).

FIG. 7 illustrates a flow diagram (700) of the source gNB informing the UE capability to the target gNB during handover according to temporary capabilities, according to an embodiment of the disclosure.

At operation 702, the method includes receiving the temporary capability change for the MUSIM operation. At operation 704, the method includes generating the UE capability applying temporary capability changes.

FIG. 8 illustrates a flow diagram (800) of the UE (100) handling capability change in RRC_IDLE, according to an embodiment of the disclosure.

At operation 802, the method includes receiving the information from the SIB that the cell does not support temporary capability changes for the MUSIM operation when the capability changed in the IDLE mode or the inactive mode for the MUSIM operations. At operation 804, the method includes performing the re-registration and updating the reduced capability.

FIG. 9 illustrates a flow diagram (900) of RRC Configuration handling with temporary capabilities, according to an embodiment of the disclosure.

At operation 902, the method includes sending the temporary capability change for the MUSIM operation and receiving the confirmation. At operation 904, the method includes receiving the RRC message with configuration not according to the reported temporary capabilities. At operation 906, the method includes failing the RRC procedure and initiating the RRC re-establishment procedure or moving to the RRC_IDLE mode.

FIG. 10 is a flowchart at operation 1001 depicting the process of handling concurrency for handover and temporary capability change, according to an embodiment of the disclosure.

At operation 1002, the method includes receiving the temporary capability change for the MUSIM operation during the handover preparation or while the CHO is configured. At operation 1004, the method includes cancelling the ongoing handover.

Figure 11:
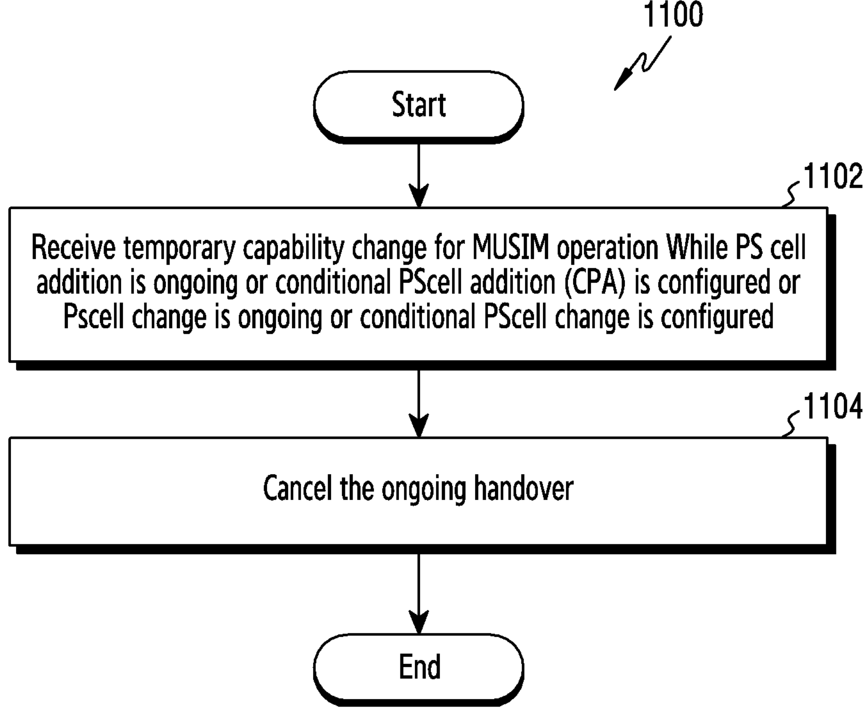
FIGS. 11 and 12 are flowcharts depicting the process of handling concurrency for DC operation and temporary capability change, according to various embodiments of the disclosure.
Figure 12:
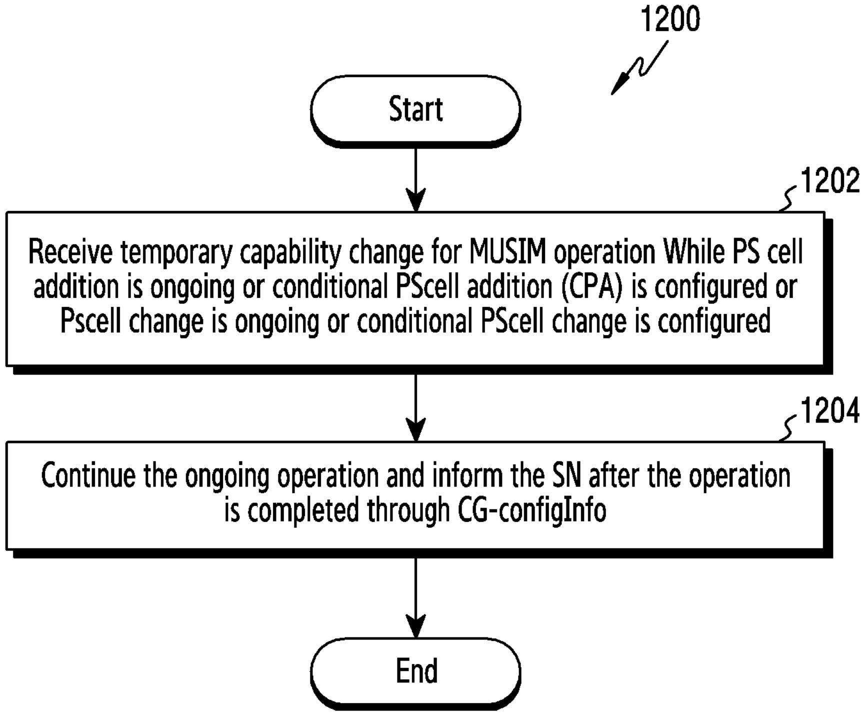

FIGS. 11 and 12 are flowcharts at operations 1100 and 1200 depicting the process of handling concurrency for DC operation and temporary capability change, according to various embodiments of the disclosure.

Referring to the FIG. 11, At operation 1102, the method includes receiving the temporary capability change for the MUSIM operation while the PS cell addition is ongoing or conditional PScell addition (CPA) is configured or Pscell change is ongoing or conditional PScell change is configured. At operation 1104, the method includes cancelling the ongoing handover.

Referring to the FIG. 12, at operation 1202, the method includes receiving the temporary capability change for the MUSIM operation while the PS cell addition is ongoing or conditional PScell addition (CPA) is configured or Pscell change is ongoing or conditional PScell change is configured. At operation 1204, the method includes continuing the ongoing operation and informing the SN after the operation is completed through CG-configInfo.

Figure 13:
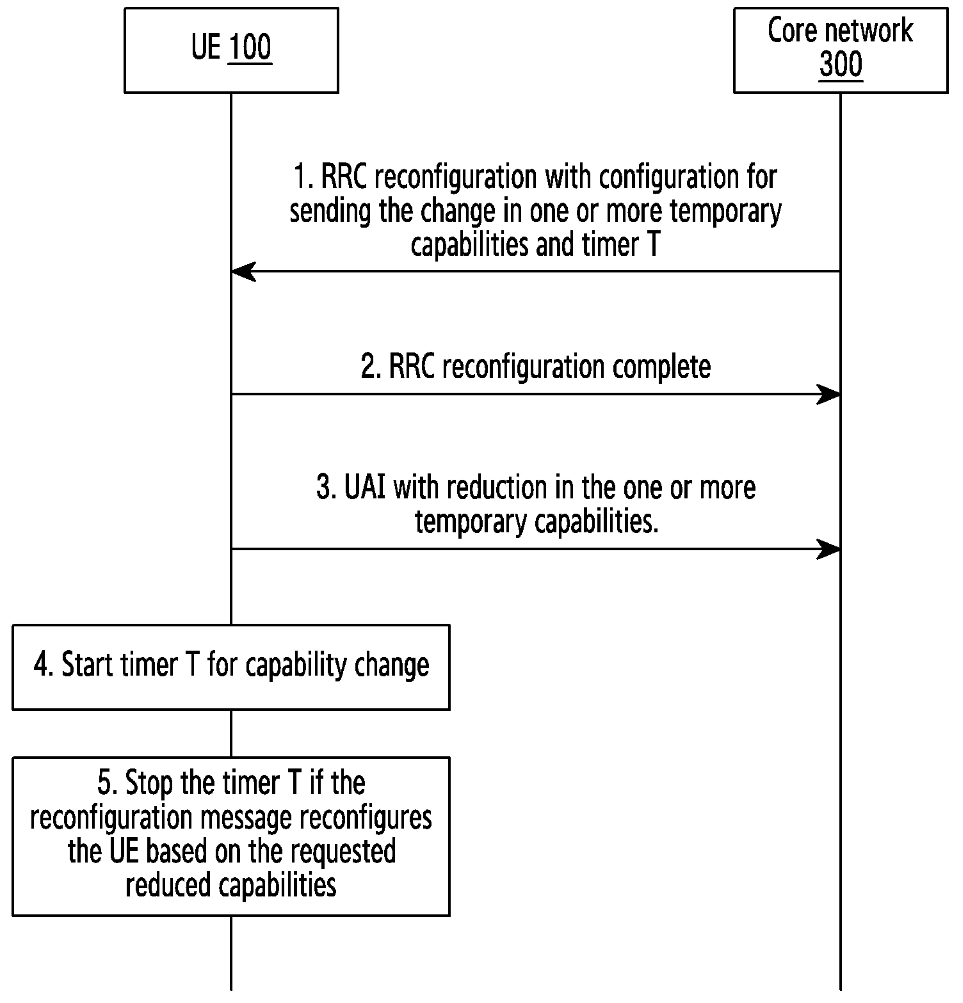
FIG. 13 is a flowchart depicting the process of handling a temporary capability change from the UE-A not being accepted by the NWK-A, according to an embodiment of the disclosure.

FIG. 13 is a flowchart depicting the process of handling a temporary capability change from the UE-A not being accepted by the NWK-A, according to an embodiment of the disclosure.

At operation 1, the UE (100) receives the RRC reconfiguration with configuration for sending the change in one or more temporary capabilities and timer T from the core network (300). At operation 2, the UE 2 sends the RRC reconfiguration complete to the core network (300). At operation 3, the UE (100) sends the UAI with reduction in the one or more temporary capabilities to the core network (300). At operation 4, the UE starts the timer T for the capability change. At operation 5, the UE 100 stops the timer T if the reconfiguration message reconfigures the UE based on the requested reduced capabilities.

The various actions, acts, blocks, steps, or the like in the flow charts (400-1200) may be performed in the order presented, in a different order or simultaneously. Further, in some embodiments, some of the actions, acts, blocks, steps, or the like may be omitted, added, modified, skipped, or the like without departing from the scope of the disclosure.

Figure 14:
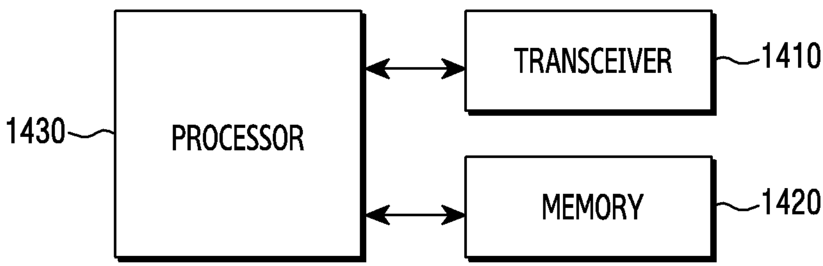
FIG. 14 illustrates a block diagram illustrating a structure of a UE according to an embodiment of the disclosure.

FIG. 14 illustrates a block diagram illustrating a structure of a UE according to an embodiment of the disclosure.

FIG. 14 corresponds to the example of the UE of FIG. 2.

Referring to FIG. 14, the UE according to an embodiment may include a transceiver 1410, memory 1420, and a processor (or a controller) 1430. The transceiver 1410, the memory 1420, and the processor 1430 of the UE may operate according to a communication method of the UE described above. However, the components of the UE are not limited thereto. For example, the UE may include more or fewer components than those described above. In addition, the processor 1430, the transceiver 1410, and the memory 1420 may be implemented as a single chip. Also, the processor 1430 may include at least one processor or at least one controller.

The transceiver 1410 collectively refers to a UE receiver and a UE transmitter, and may transmit/receive a signal to/from a base station or a network entity. The signal transmitted or received to or from the base station or a network entity may include control information and data. The transceiver 1410 may include a RF transmitter for up-converting and amplifying a frequency of a transmitted signal, and a RF receiver for amplifying low-noise and down-converting a frequency of a received signal. However, this is only an example of the transceiver 1410 and components of the transceiver 1410 are not limited to the RF transmitter and the RF receiver.

Also, the transceiver 1410 may receive and output, to the processor 1430, a signal through a wireless channel, and transmit a signal output from the processor 1430 through the wireless channel.

The memory 1420 may store a program and data required for operations of the UE. Also, the memory 1420 may store control information or data included in a signal obtained by the UE. The memory 1420 may be a storage medium, such as read-only memory (ROM), random access memory (RAM), a hard disk, a CD-ROM, and a DVD, or a combination of storage media.

The processor 1430 may control a series of processes such that the UE operates as described above. For example, the transceiver 1410 may receive a data signal including a control signal transmitted by the base station or the network entity, and the processor 1430 may determine a result of receiving the control signal and the data signal transmitted by the base station or the network entity.

Figure 15:
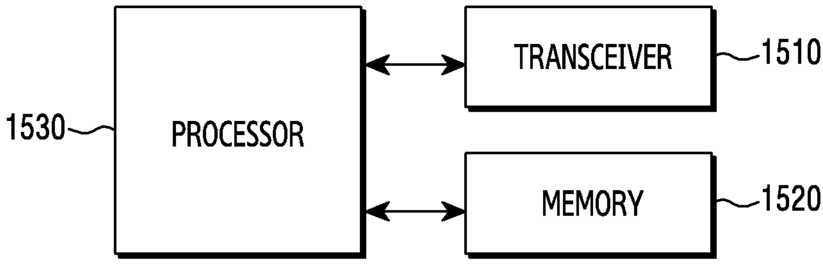
FIG. 15 illustrates a block diagram illustrating a structure of a base station according to an embodiment of the disclosure, according to an embodiment of the disclosure.

FIG. 15 illustrates a block diagram illustrating a structure of a base station according to an embodiment of the disclosure.

FIG. 15 corresponds to the example of the network entity of FIG. 3.

Referring to FIG. 15, the base station according to an embodiment may include a transceiver 1510, memory 1520, and one or more processors (or a controller) 1530. The transceiver 1510, the memory 1520, and the processor 1530 of the base station may operate according to a communication method of the base station described above. However, the components of the base station are not limited thereto. For example, the base station may include more or fewer components than those described above. In addition, the processor 1530, the transceiver 1510, and the memory 1520 may be implemented as a single chip. Also, the processor 1530 may include at least one processor and at least one controller.

The transceiver 1510 collectively refers to a base station receiver and a base station transmitter, and may transmit/receive a signal to/from a terminal or a network entity. The signal transmitted or received to or from the terminal or a network entity may include control information and data. The transceiver 1510 may include a RF transmitter for up-converting and amplifying a frequency of a transmitted signal, and a RF receiver for amplifying low-noise and down-converting a frequency of a received signal. However, this is only an example of the transceiver 1510 and components of the transceiver 1510 are not limited to the RF transmitter and the RF receiver.

Also, the transceiver 1510 may receive and output, to the processor 1530, a signal through a wireless channel, and transmit a signal output from the processor 1530 through the wireless channel.

The memory 1520 may store a program and data required for operations of the base station. Also, the memory 1520 may store control information or data included in a signal obtained by the base station. The memory 1520 may be a storage medium, such as read-only memory (ROM), random access memory (RAM), a hard disk, a CD-ROM, and a DVD, or a combination of storage media.

The processor 1530 may control a series of processes such that the base station operates as described above. For example, the transceiver 1510 may receive a data signal including a control signal transmitted by the terminal, and the processor 1530 may determine a result of receiving the control signal and the data signal transmitted by the terminal.

Embodiments disclosed herein provide a method for handling a temporary User Equipment (UE) capability change for a Multi Universal Subscriber Identity Module (MUSIM) UE in a wireless network. The method includes receiving, by a UE, an information from a network entity. The network entity broadcasts the information in a System Information Block (SIB) indicating about whether the network entity supports a temporary UE capability change handling for a MUSIM operation in the wireless network. Further, the method includes handling, by the UE, the temporary UE capability changes for the MUSIM operation in the wireless network based on the broadcasted information.

In an embodiment, handling, by the UE, the temporary UE capability changes for the MUSIM operation in the wireless network includes determining, by the UE, a capability has reduced while the UE is in an RRC_INACTIVE state or an RRC_IDLE state, performing, by the UE, re-registration with a core network upon initiating a radio resource control (RRC) connection setup procedure in a cell wherein the cell doesn't support the temporary UE capability change based on the determination, and informing, by the UE, the updated UE capability to the core network during the registration procedure by applying the reduced temporary capability.

In an embodiment, handling, by the UE, the temporary UE capability changes for the MUSIM operation in the wireless network includes receiving, by the UE, a configuration for reporting temporary capability changes wherein the configuration comprises a timer, determining, by the UE, a capability has reduced while the UE, initiating, by the UE, a transmission to request for the temporary capability change based on the reduced capabilities as a result of determination, starting, by the UE, the timer, receiving, by the UE, a RRCReconfiguration message, and performing, by the UE, one of: stopping, by the UE, the timer if the reconfiguration message reconfigures the UE based on the requested reduced capabilities, and continuing the timer if the reconfiguration message does not reconfigure the UE based on the requested reduced capabilities.

In an embodiment, the timer is a RRC timer.

In an embodiment, the UE starts the timer when the UE is unable to handle a current configuration based on the reduced temporary capability.

Embodiments disclosed herein provide a method for handling a temporary UE capability change for a MUSIM UE in a wireless network. The method includes informing, by a target network entity or an Operations, Administration and Maintenance (OAM) entity, to a source network entity, whether the target network entity supports handling of a temporary UE capability change. Further, the method includes handling, by the source network entity, the temporary UE capability change for the MUSIM UE in the wireless network based on the received information.

In an embodiment, handling, by the source network entity, the temporary UE capability change for the MUSIM UE in the wireless network includes sending, by the source network entity, a HandoverPreparationInformation to the target network entity, where the HandoverPreparationInformation includes a permanent UE capability and a request for temporary UE capability changes received from the UE, where the request for temporary UE capability changes is received in a Radio Resource Control (RRC) message, and handling, by the target network entity, the temporary UE capability changes for the MUSIM UE in the wireless network based on the HandoverPreparationInformation.

In an embodiment, when the target network entity does not support the handling of the temporary UE capability changes, sending, by the source network entity, the HandoverPreparationInformation to the target network entity includes generating a UE-CapabilityRAT-List in the HandoverPreparationInformation by applying the received temporary capability to the permanent UE capabilities, and sending, by the source network entity, the HandoverPreparationInformation comprising the UE-CapabilityRAT-List.

Embodiments disclosed herein provide a method for handling a temporary User Equipment (UE) capability change for a MUSIM UE in a wireless network. The method includes configuring, by a source network entity in the wireless network, a configuration for reporting temporary capability changes at a UE. Further, the method includes receiving, by the source network entity, a request for temporary capability change for a MUSIM operation while a handover is ongoing. Further, the method includes performing, by the source network entity; at least one of: sending a Xn Handover cancel message to the target network entity to cancel the handover when the handover is an Inter-gNB handover, and releasing a conditional handover configuration at the UE and target gNB.

In an embodiment, the source network entity releases the configuration for reporting temporary capability changes before executing a Dual Active Protocol Stack (DAPS) handover.

Embodiments disclosed herein provide a UE including a temporary UE capability handling controller coupled with a processor and memory. The temporary UE capability handling controller is configured to receive an information from a network entity. The network entity broadcasts the information in a SIB indicating about whether the network entity supports a temporary UE capability change handling for a MUSIM operation in the wireless network. Further, the temporary UE capability handling controller is configured to handle the temporary UE capability changes for the MUSIM operation in the wireless network based on the broadcasted information.

Embodiments disclosed herein provide a wireless network including a target network entity informing to a source network entity, whether the target network entity supports handling of a temporary UE capability change. Further, the source network entity handles the temporary UE capability change for the MUSIM UE in the wireless network based on the received information.

Embodiments disclosed herein provide a source network entity including a temporary UE capability handling controller coupled with a processor and memory. The temporary UE capability handling controller is configured to configure a configuration for reporting temporary capability changes at a UE. Further, the temporary UE capability handling controller is configured to receive a request for temporary capability change for a MUSIM operation while a handover is ongoing or a PSCellAddition is going. Further, the temporary UE capability handling controller is configured to perform at least one of: send a Xn Handover cancel message to the target network entity to cancel the handover when the handover is an Inter-gNB handover, and release a conditional handover configuration at the UE and the target network entity.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A user equipment (UE) in a wireless communication system, the UE comprising:
- a transceiver; and
- a controller coupled with the transceiver, and configured to:
  - receive, from a base station, a system information block (SIB) including a first indication on whether a transmission of a second indication is allowed,
  - identify that a UE capability is restricted for a multi-universal subscriber identity module (MUSIM) operation,
  - transmit, to the base station, a radio resource control (RRC) message including the second indication indicating a UE temporary capability restriction due to the MUSIM operation,
  - receive, from the base station, information configuring a timer for the restricted UE capability for the MUSIM operation, and
  - if the UE has a temporary capability restriction on a current configuration of the UE:
    - transmit, to the base station, a message for requesting a release of a configuration of the UE; and
    - start the timer.

2. The UE of claim 1, wherein the RRC message includes an RRC setup complete message or an RRC resume complete message.

3. The UE of claim 1, wherein the timer is stopped upon a reception of an RRC reconfiguration message.

4. A base station (BS) in a wireless communication system, the BS comprising:
- a transceiver; and
- a controller coupled with the transceiver, and configured to:
  - transmit, to a user equipment (UE), a system information block (SIB) including a first indication on whether a reception of a second indication is allowed,
  - receive, from the UE, a radio resource control (RRC) message including the second indication indicating a UE temporary capability restriction due to a multi-universal subscriber identity module (MUSIM) operation,
  - transmit, to the UE, information configuring a timer for the restricted UE capability for the MUSIM operation, the timer being started if the UE has a temporary capability restriction on a current configuration of the UE, and
  - receive, from the UE, a message for requesting a release of a configuration of the UE.

5. The BS of claim 4, wherein the RRC message includes an RRC setup complete message or an RRC resume complete message.

6. The BS of claim 4, wherein the timer is stopped upon a reception of an RRC reconfiguration message.

7. A method performed by a user equipment (UE) in a wireless communication system, the method comprising:
- receiving, from a base station, a system information block (SIB) including a first indication on whether a transmission of a second indication is allowed;
- identifying that a UE capability is restricted for a multi-universal subscriber identity module (MUSIM) operation;
- transmitting, to the base station, a radio resource control (RRC) message including the second indication indicating a UE temporary capability restriction due to the MUSIM operation;
- receiving, from the base station, information configuring a timer for the restricted UE capability for the MUSIM operation; and
- if the UE has a temporary capability restriction on a current configuration of the UE:
  - transmitting, to the base station, a message for requesting a release of a configuration of the UE, and
  - starting the timer.

8. The method of claim 7, wherein the RRC message includes an RRC setup complete message or an RRC resume complete message.

9. The method of claim 7, wherein the timer is stopped upon a reception of an RRC reconfiguration message.

10. A method performed by a base station (BS) in a wireless communication system, the method comprising:
- transmitting, to a user equipment (UE), a system information block (SIB) including a first indication on whether a reception of a second indication is allowed;
- receiving, from the UE, a radio resource control (RRC) message including the second indication indicating a UE temporary capability restriction due to a multi-universal subscriber identity module (MUSIM) operation;
- transmitting, to the UE, information configuring a timer for the restricted UE capability for the MUSIM operation, the timer being started if the UE has a temporary capability restriction on a current configuration of the UE; and
- receiving, from the UE, a message for requesting a release of a configuration of the UE.

11. The method of claim 10, wherein the RRC message includes an RRC setup complete message or an RRC resume complete message.

12. The method of claim 10, wherein the timer is stopped upon a reception of an RRC reconfiguration message.

* * * * *